United States Patent
Lotti et al.

(10) Patent No.: US 12,548,277 B2
(45) Date of Patent: Feb. 10, 2026

(54) SYSTEMS AND METHODS FOR USING AUGMENTED REALITY TO PREVIEW FALSE EYELASHES

(71) Applicant: Lashify, Inc., North Hollywood, CA (US)

(72) Inventors: Sahara Lotti, North Hollywood, CA (US); Jesse Chang, Palo Alto, CA (US)

(73) Assignee: Lashify, Inc., North Hollywood, CA (US)

( * ) Notice: Subject to any disclaimer, the term of this patent is extended or adjusted under 35 U.S.C. 154(b) by 0 days.

(21) Appl. No.: 19/011,351

(22) Filed: Jan. 6, 2025

(65) Prior Publication Data

US 2025/0322631 A1    Oct. 16, 2025

Related U.S. Application Data

(63) Continuation of application No. 18/632,063, filed on Apr. 10, 2024, now Pat. No. 12,198,289.

(51) Int. Cl.
*G06T 19/20*    (2011.01)
*G06T 7/246*    (2017.01)
*G06T 7/73*    (2017.01)

(52) U.S. Cl.
CPC .............. *G06T 19/20* (2013.01); *G06T 7/246* (2017.01); *G06T 7/73* (2017.01); *G06T 2207/10016* (2013.01); *G06T 2207/20092* (2013.01); *G06T 2207/30201* (2013.01); *G06T 2219/2016* (2013.01)

(58) Field of Classification Search
USPC ........................................................ 345/411
See application file for complete search history.

(56) References Cited

U.S. PATENT DOCUMENTS

| | | | |
|---|---|---|---|
| 9,058,765 B1* | 6/2015 | Mallick | G06Q 30/0256 |
| 11,069,094 B1* | 7/2021 | Evangelista | G06T 11/60 |
| 11,335,069 B1 | 5/2022 | Savchenkov et al. | |
| 11,344,102 B2 | 5/2022 | Fu et al. | |
| 12,118,821 B1 | 10/2024 | Lotti et al. | |
| 12,198,289 B1 | 1/2025 | Lotti et al. | |
| 12,293,604 B1 | 5/2025 | Lotti et al. | |
| 2014/0016823 A1* | 1/2014 | Ye | G06T 19/20 |
| | | | 382/103 |
| 2022/0300728 A1 | 9/2022 | Assouline et al. | |
| 2023/0067305 A1 | 3/2023 | Assa et al. | |
| 2023/0334801 A1* | 10/2023 | He | G06T 19/20 |
| 2024/0037882 A1 | 2/2024 | Zhu et al. | |

FOREIGN PATENT DOCUMENTS

| | | |
|---|---|---|
| CN | 111627106 A | 9/2020 |
| WO | 2021242765 A1 | 12/2021 |
| WO | 2022103862 A1 | 5/2022 |

* cited by examiner

*Primary Examiner* — James A Thompson
*Assistant Examiner* — Kim Thanh T Tran
(74) *Attorney, Agent, or Firm* — Lowenstein Sandler LLP

(57) ABSTRACT

A first computer vision operation is performed on a first video segment of a video stream to track points corresponding to an underside of natural eyelashes of an eye area of a subject. The first video segment is modified to include a first overlay of a first model of a first artificial lash extension positioned at least at a first point of the points corresponding to the underside of the natural eyelashes. The first modified video segment is provided for presentation at a client device associated with the subject.

20 Claims, 16 Drawing Sheets

SYSTEMS AND METHODS FOR USING AUGMENTED REALITY TO PREVIEW FALSE EYELASHES

RELATED APPLICATION

This application is a continuation of U.S. patent application Ser. No. 18/632,063, filed Apr. 10, 2024, entitled "SYSTEMS AND METHODS FOR USING AUGMENTED REALITY TO PREVIEW FALSE EYELASHES," the contents of which are hereby incorporated by reference in its entirety herein.

TECHNICAL FIELD

Aspects and embodiments of the disclosure relate to application of false eyelashes, and more specifically, to systems and methods for using augmented reality to preview false eyelashes.

BACKGROUND

False eyelashes are commonly used to enhance beauty characteristics, especially of human eyes. Different eye and facial features can be enhanced using different types, sub-types, and configurations of false eyelashes.

SUMMARY

The following is a simplified summary of the disclosure to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

An aspect of the disclosure provides a computer-implemented method for using augmented reality to preview artificial lash extensions on a subject, the method comprising: receiving, by a processing device and from a client device, a first video segment of a video stream, wherein the first video segment represents an eye area of a subject; performing a first computer vision operation on the first video segment to track a plurality of points corresponding to the eye area of the subject; modifying the first video segment to include an overlay of a first 3D model of false eyelashes proximate the tracked points corresponding to the eye area of the subject; and providing the first modified video segment for presentation at the client device.

In some embodiments, the first 3D model of false eyelashes comprises a first 3D sub-model of a first artificial lash extension and a second 3D sub-model of a second artificial lash extension, wherein modifying the first video segment to include the overlay of the first 3D model of false eyelashes proximate the tracked points corresponding to the eye area of the subject, comprises: modifying the first video segment to include a first sub-overlay of the first 3D sub-model of the first artificial lash extension proximate a first subset of the plurality of points and to include a second sub-overlay of the second 3D sub-model of the second artificial lash extension proximate a second subset of the plurality of points, wherein the first sub-overlay and the second sub-overlay are positioned proximate the tracked points corresponding to an area of the first video segment representing an underside of natural eyelashes of an eye of the subject.

In some embodiments, the method further comprises: determining an orientation of the first 3D model of false eyelashes with respect to the eye area represented in the first video segment.

In some embodiments, the method further comprises: determining a location of the first 3D model of false eyelashes with respect to the eye area represented in the first video segment.

In some embodiments, the method further comprises: scaling of the first 3D model of false eyelashes to correspond with the location of the first 3D model of false eyelashes with respect to the eye area represented in the first video segment.

In some embodiments, the method further comprises: generating, using the first video segment, a second 3D model of the eye area of the subject.

In some embodiments, the determining the orientation of the first 3D model of false eyelashes with respect to the eye area represented in the first video segment, comprises: orientating the second 3D model of the eye area in a coordinate system; and orientating the first 3D model of false eyelashes in the coordinate system and with respect to the second 3D model. In some embodiments, determining the location of the first 3D model of false eyelashes with respect to the eye area represented in the first video segment, comprises: identifying a plurality of landmarks on the second 3D model of the eye area of the subject, the plurality of landmarks corresponding to the plurality of points of the first video segment; and positioning the first 3D model of false eyelashes with respect to the plurality of landmarks.

In some embodiments, scaling the first 3D model of false eyelashes to correspond with the location of the first 3D model of false eyelashes with respect to the eye area represented in the first video segment, comprises: scaling dimensions of the first 3D model of false eyelashes to correspond to a location and the orientation within the coordinate system.

In some embodiments, the method further comprises: determining mapping data that maps the coordinate system of the first 3D model of false eyelashes and the second 3D model of the eye area to the first video segment, wherein the overlay is positioned in the first video segment based on the mapping data.

In some embodiments, the method further comprises: receiving an indication of a user selection of the false eyelashes among a plurality of false eyelashes.

In some embodiments, the method further comprises: performing a second computer vision operation on a second video segment of the video stream to track a point corresponding to a user placement of the first 3D model of false eyelashes; determining whether a position of the tracked point corresponding to the user placement of the first 3D model of false eyelashes satisfies a condition indicative of a threshold proximity to one or more of the tracked points corresponding to the eye area; and responsive to determining that the position of the tracked point corresponding to the user placement of the first 3D model of false eyelashes satisfies the condition, modifying the second video segment to position the overlay of the first 3D model of false eyelashes with respect to the one or more of the tracked points.

In some embodiments, the method further comprises: performing a second computer vision operation on a second video segment of the video stream to track a point corresponding to a user placement of the first 3D model of false eyelashes; determining whether a position of the tracked point corresponding to the user placement of the first 3D model of false eyelashes satisfies a condition indicative of a threshold proximity to one or more of the tracked points corresponding to the eye area; and responsive to determining that the position of the tracked point corresponding to the user placement of the first 3D model of false eyelashes satisfies the condition, modifying the second video segment to position the overlay of the first 3D model of false eyelashes with respect to the one or more of the tracked points.

A further aspect of the disclosure provides a system comprising: a memory device; and a processing device, coupled to the memory device, the processing device to perform a method according to any aspect or embodiment described herein. A further aspect of the disclosure provides a computer-readable medium comprising instructions that, responsive to execution by a processing device, cause the processing device to perform operations comprising a method according to any aspect or embodiment described herein.

BRIEF DESCRIPTION OF THE DRAWINGS

Aspects and embodiments of the disclosure will be understood more fully from the detailed description given below and from the accompanying drawings of various aspects and embodiments of the disclosure, which, however, should not be taken to limit the disclosure to the specific aspects or embodiments, but are for explanation and understanding.

DETAILED DESCRIPTION

Figure 1A:
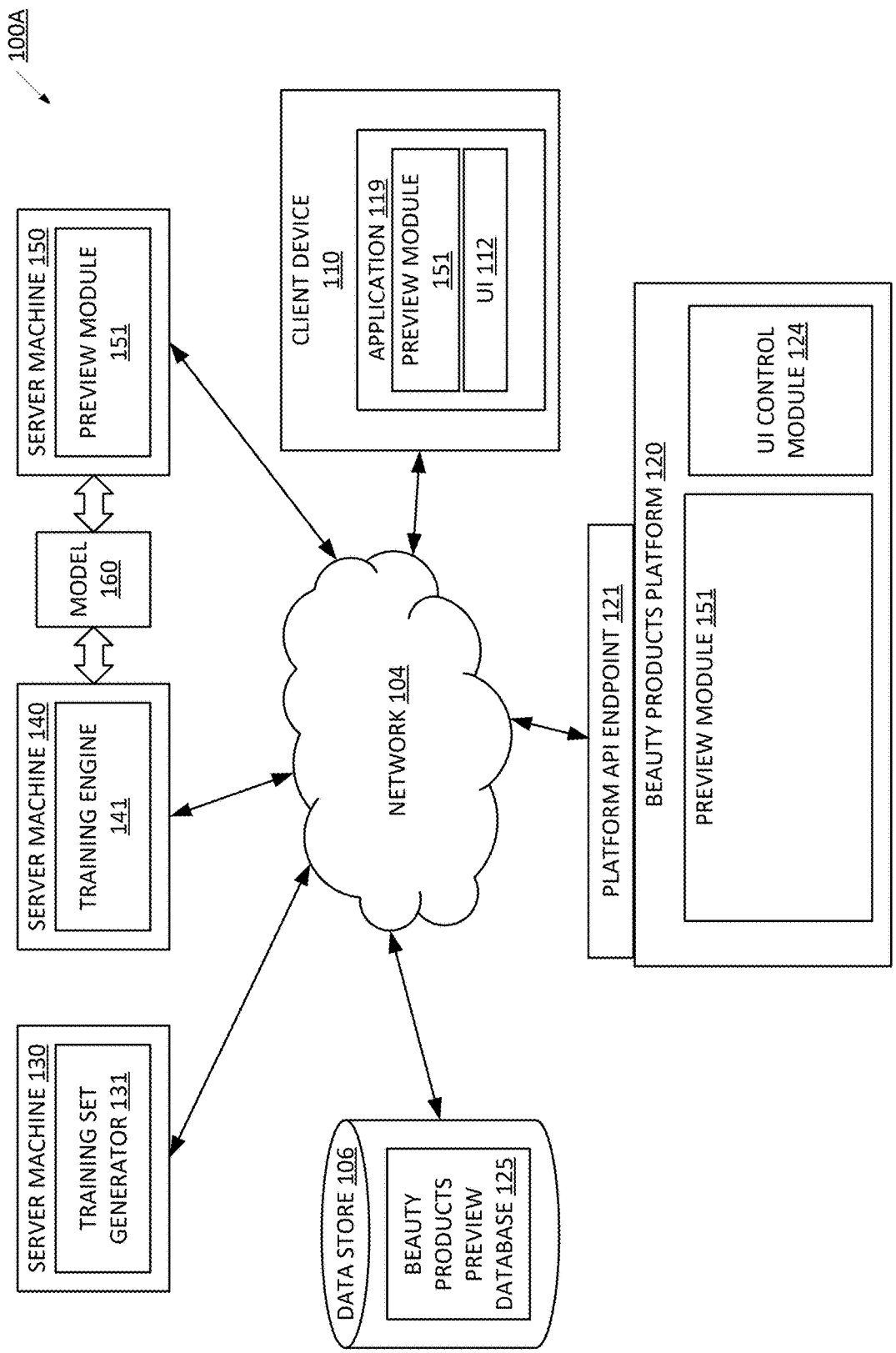
FIG. 1A illustrates an example system architecture, in accordance with some embodiments of the disclosure.

False eyelashes (also referred to as "false lashes" herein) can include one or more artificial hairs that are often used to enhance the appearance of the eye area, and in particular, enhance the appearance of a user's eyes and/or natural lashes. False eyelashes can include strip lashes often applied to a user's eyelids, individual hairs, individual clusters, a set of artificial lash extensions (e.g., applied to the underside of the user's natural eyelashes), among others.

Conventionally, previewing false eyelashes includes physically trying on false eyelashes, which can be costly and time-consuming. The application process can be prohibitive in terms of both time and expense, often deterring users from experimenting with different lash styles.

Some systems for previewing some beauty products can include a virtual application of various beauty products on a subject's face. However, these systems for previewing beauty products often use static images (e.g., static images) and lack a precision in size, location, and/or orientation of the virtual item, leading to deficiencies in realism and the ability to accurately gauge the final appearance. Additionally, such systems can have difficulty in realistically rendering small beauty products, such as false eyelashes, on small facial features, such as the eyelid or the underside of the natural lashes.

Aspects of the present disclosure address the above challenges as well as others by using computer vision techniques to generate an augmented reality (AR) environment that positions one or more virtual elements, such as a 3D model of false eyelashes, as an overlay to a video segment that includes a representation of a subject's face.

In some embodiments, a video segment of a video stream having a representation of the subject's face can be received by the beauty products platform. A computer vision operation can be performed on the video segment to track one or more points (e.g., two-dimensional (2D) points) of the video segment across multiple video frames. The tracked points can correspond to the eye area of the subject. For example, the tracked points can be points at the underside of the natural eyelashes proximate the upper lash line.

In some embodiments, beauty products platform can receive an indication of a user selection of false eyelashes among a set of false eyelashes for preview using AR. Using the tracked points, the beauty products platform can modify the video segment to include an overlay of a 3D model of false eyelashes (e.g., virtual element) proximate the tracked points corresponding to the eye area of the subject. For example, one or more virtual elements representing one or more artificial lash extensions can be positioned in the frames of the video segment at the tracked points such that the virtual elements representing artificial lash extensions are positioned at a location(s) in video frames of the video segment representing the underside of the natural eyelashes as represented in the video frames. The modified video segment including the overlay of the 3D model of false eyelashes proximate the tracked points is provided to the client device for presentation in real-time in an AR environment.

In some embodiments, as the face of subject moves the position of overlay 3D model of false eyelashes is correspondingly re-positioned to reflect the change in position of the subject's eye area. The modified video segment includes the 3D model of false eyelashes that is re-positioned in successive frames to reflect the change in position of the subject's eye area. In some embodiments, one or more of the location, orientation, or scale of the 3D model of false eyelashes can be determined and adjusted to reflect the change in position of the subject's eye area.

In some embodiments, the overlay of 3D model of false eyelashes can be positioned in the video segment based on 2D information, such as the tracked points (e.g., pixels) of the video segment.

In some embodiments, the overlay of the 3D model of false eyelashes can be positioned in the video segment based on 3D information. In some embodiments, a 3D model of the eye area can be generated based on one or more frames of the video segment. For example, a pre-existing 3D model of a face can be adjusted to fit the subject's face represented in the video segment. The 3D model can be re-adjusted to fit the subject's face as the position changes. A 3D coordinate system can be determined for the 3D model and the 3D coordinate system can map to the 2D coordinate system of the video segment. The tracked points (2D points) can be mapped to the 3D coordinate system. The 3D model of the false eyelashes can be positioned with respect to the 3D coordinate system. In some embodiments, one or more of the location, orientation, and scale of the 3D model of the false eyelashes can be adjusted based on the changes in the position of the subject's face represented between frames of the video segment and the 3D coordinate system.

In some embodiments, the modified video can be used to provide a preview of false eyelashes in conjunction with a "snap and drag" operation performed by a user. For example, a user using a cursor or touch command can select an artificial lash extension and move (e.g., "drag") a virtual element representing an artificial lash extension to a position in a GUI representing the eye area of the subject. In some embodiments, the position of the virtual element representing the artificial lash extension can be tracked. Responsive to determining the virtual element representing the artificial lash extension is within a threshold distance of a tracked visual feature (e.g., an eye or the tracked points), the virtual element representing the artificial lash extension can be positioned (by the beauty products platform) at one or more of the tracked points (e.g., "snapped"). For example, responsive to detecting that the virtual element representing the artificial lash extension is within 2 centimeters from the right eye, the virtual element is automatically positioned on a respective one or more of the tracked points located at a representation of the underside of the natural eyelashes.

As noted, a technical problem addressed by some embodiments of the disclosure is using 2D video, and in particular 2D video of a subject's face to generate an AR (or virtual reality VR) environment with modified video segments in real time, and/or providing modified video segments with visual elements with adequate accuracy in positioning with respect to the eye area of the human face.

A technical solution to the above identified technical problem can include using computer vision techniques (e.g., image processing techniques) that use 2D video to identify detect and track one or more of 2D points and use the detected points to position visual elements, such as false eyelashes in a modified video stream (e.g., AR video stream).

Another technical solution to the above identified technical problem can include using computer vision techniques that use 2D video to generate a 3D model that is used to help position (and/or locate, orientate and/or scale) a virtual element, such as a 3D model of false eyelashes, in a video segment to generate a modified video segment for AR.

Thus, the technical effect can include improves the quality of AR video segment and/or the accuracy of placement of visual indica within a AR video segment.

In some embodiments, a beauty product can refer to any substance or item designed for use on the body, particularly the face, skin, hair, and nails, often with the purpose of enhancing and/or maintaining beauty and appearance.

A facial feature can refer to a physical characteristic or element that is part of a human face. Facial features can include, but are not limited to the lips, nose, tip of the nose, bridge of the nose, eyes, inner eye, pupil, eyelids, eyebrows, inner eyebrow, outer eyebrow, center eyebrow, cheeks (e.g., cheek bones, etc.), jaw (e.g., jawline, etc.), among others.

Embodiments of the disclosure are directed to artificial lash extensions for purposes of illustration, rather than limitation. It can be appreciated that embodiments of the disclosure can be implemented using false eyelashes generally and beauty products, more generally. False eyelashes can refer to cosmetic accessories used to enhance the appearance of the eye area, and in many case natural eyelashes. False eyelashes can include, but are not limited to, strip lashes (that can be attached to the eyelid), individual clusters of artificial hairs, individual artificial hairs, and artificial lash extensions, among others.

FIG. 1A illustrates an example of a system 100A, in accordance with aspects of the disclosure. The system 100A includes a beauty products platform 120, one or more server machines 130-150, a data store 106, and client device 110 connected to network 104. In some embodiments, system 100A can include one or more other platforms (such as those illustrated in FIG. 1B).

In some embodiments, beauty product previews, (e.g., enhanced by AR technology) can refer to methods for visualizing and trying on beauty products. AR beauty product previews can allow beauty products to be preview without actually applying the products. These AR previews can provide a personalized glimpse into how products such as cosmetics, hair colors, and nail polishes will look on the user. Skincare previews through AR can simulate the potential effects of various treatments and serums on the user's skin, illustrating improvements in texture, tone, and hydration. Haircare previews can allow individuals to see themselves with different hair colors, cuts, or styles, thereby facilitating informed decisions about new products or treatments. In the realm of cosmetics, AR technology enables users to preview a wide range of makeup products including foundation, lipstick, eyeshadow, and mascara, showcasing the products' colors and finishes on their own faces in real-time. Nail care previews through AR can display an array of polish colors and finishes on the user's own nails. In some embodiments, false eyelashes previews can show false eyelashes (e.g., artificial lash extensions) as an AR artifact placed as an overlay of a 2D image (e.g., still image or video frame) representing a user's face.

In some embodiments, network 104 can include a public network (e.g., the Internet), a private network (e.g., a local area network (LAN) or wide area network (WAN)), a wired network (e.g., Ethernet network), a wireless network (e.g., an 802.11 network or a wireless fidelity (Wi-Fi) network), a cellular network (e.g., a Long Term Evolution (LTE) network), routers, hubs, switches, server computers, and/or a combination thereof.

Data store 106 can be a persistent storage that is capable of storing data such as beauty products tutorial information, 2D image information, 3D model information, machine learning model data, etc. Data store 106 can be hosted by one or more storage devices, such as main memory, magnetic or optical storage-based disks, tapes or hard drives, network-attached storage (NAS), storage area network (SAN), and so forth. In some embodiments, data store 106 can be a network-attached file server, while in other embodiments the data store 106 can be another type of persistent storage such as an object-oriented database, a relational database, and so forth, that can be hosted by beauty products platform 120, or one or more different machines coupled to the server hosting the beauty products platform 120 via the network 104. In some embodiments, data store 106 can be capable of storing one or more data items, as well as data structures to tag, organize, and index the data items. A data item can include various types of data including structured data, unstructured data, vectorized data, etc., or types of digital files, including video data, text data, audio data, image data, multimedia, interactive media, data objects, and/or any suitable type of digital resource, among other types of data. An example of a data item can include a file, database record, database entry, programming code or document, among others.

In some embodiments, data store 106 can implement beauty products preview database 125. In some embodiments, beauty products preview database 125 can store information (e.g., data items) related to one or more beauty products previews (e.g., for preview of artificial lash extensions).

In some embodiments, beauty products preview database 125 can include a vector database. In some embodiment, a vector database can index and/or store vector data, such as vector embeddings (e.g., also referred to as vector embedding data). In some embodiments, the vector embedding data can have the same or variable dimensionality. The vector embedding data can include one or more of video embedding (e.g., vector representation of a video), word embedding data (e.g., vector representation of a word), image embedding data (e.g., vector representation of an image), audio embedding data (e.g., vector representation of audio content), and so forth. In some embodiments, the vector embedding data can represent one or more beauty products. Additional details of beauty products preview database 125 are further described herein.

The client device(s) 110 may each include a type of computing device such as a desktop personal computer (PCs), laptop computer, mobile phone, tablet computer, netbook computer, wearable device (e.g., smart watch, smart glasses, etc.) network-connected television, smart appliance (e.g., video doorbell), any type of mobile device, etc. In some embodiments, client device(s) 110 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components. In some embodiments, client device(s) may also be referred to as a "user device" herein. Although a single client device 110 is shown for purposes of illustration rather than limitation, one or more client devices can be implemented in some embodiments. Client device 110 will be referred to as client device 110 or client devices 110 interchangeably herein.

In some embodiments, a client device, such as client device 110, can implement or include one or more applications, such as application 119 executed at client device 110. In some embodiments, application 119 can be used to communicate (e.g., send and receive information) with beauty products platform 120 beauty products platform 120. In some embodiments, application 119 can implement user interfaces (UIs) (e.g., graphical user interfaces (GUIs)), such as UI 112 that may be webpages rendered by a web browser and displayed on the client device 110 in a web browser window. In another embodiment, the UIs 112 of client application 119 may be included in a stand-alone application downloaded to the client device 110 and natively running on the client device 110 (also referred to as a "native application" or "native client application" herein). In some embodiments, preview module 151 can be implemented as part of application 119. In other embodiments, preview module 151 can be separate from application 119 and application 119 can interface with preview module 151.

In some embodiments, one or more client devices 110 can be connected to the system 100A. In some embodiments, client devices, under direction of the beauty products platform 120 when connected, can present (e.g., display) a UI 112 to a user of a respective client device through application 119. The client devices 110 may also collect input from users through input features.

In some embodiments, a UI 112 may include various visual elements (e.g., UI elements) and regions, and may be a mechanism by which the user engages with the beauty products platform 120, and system 100A at large. In some embodiments, the UI(s) of the client device(s) 110 can include multiple visual elements and regions that enable presentation of information, for decision-making, content delivery, etc. at a client device 110. In some embodiments, the UI 112 may sometimes be referred to as a graphical user interface (GUI)).

In some embodiments, the UI(s) 112 and/or client device 110 can include input features to intake information from a client device 110. In one or more examples, a user of client device 110 can provide input data (e.g., a user query, control commands, etc.) into an input feature of the UI 112 or client device 110, for transmission to the beauty products platform 120, and system 100A at large. Input features of UI 112 and/or client device 110 can include space, regions, or elements of the UI 112 that accept user inputs. For example, input features may include visual elements (e.g., GUI elements) such as buttons, text-entry spaces, selection lists, drop-down lists, etc. For example, in some embodiments, input features may include a chat box which a user of client device 110 may use to input textual data (e.g., a user query). The application 119 via client device 110 may then transmit that textual data to beauty products platform 120, and the system 100A at large, for further processing. In other examples, input features may include a selection list, in which a user of client device 110 can input selection data e.g., by selecting, or clicking. The application 119 via client device 110 may then transmit that selection data to beauty products platform 120, and the system 100A at large, for further processing.

In some embodiments, client device 110 can include a camera (e.g., digital camera) to capture images, such as two-dimensional (2D) images, and video (e.g., sequential video frames of a video item). The images and/or video can be sent to beauty products platform 120 using application 119. In some embodiments, client device 110 can stream a video item to beauty products platform 120 using application 119. The video frames of a video item can be arranged (e.g., sequentially arranged) using timestamps. In some embodiments, application 119 can be used to implement augmented reality (AR) or virtual reality (VR) features at client device 110.

In some embodiments, a client device 110 can access the beauty products platform 120 through network 104 using one or more application programming interface (API) calls via platform API endpoint 121. In some embodiments, beauty products platform 120 can include multiple platform API endpoints 121 that can expose services, functionality, or information of the beauty products platform 120 to one or more client devices 110. In some embodiments, a platform API endpoint 121 can be one end of a communication channel, where the other end can be another system, such as a client device 110 associated with a user account. In some embodiments, the platform API endpoint 121 can include or be accessed using a resource locator, such a universal resource identifier (URI), universal resource locator (URL), of a server or service. The platform API endpoint 121 can receive requests from other systems, and in some cases, return a response with information responsive to the request. In some embodiments, HTTP or HTTPS methods (e.g., API calls) can be used to communicate to and from the platform API endpoint 121.

In some embodiments, the platform API endpoint 121 can function as a computer interface through which access requests are received and/or created. In some embodiments, the platform API endpoint 121 can include a platform API whereby external entities or systems can request access to services and/or information provided by the beauty products platform 120. The platform API can be used to programmatically obtain services and/or information associated with a request for services and/or information.

In some embodiments, the API of the platform API endpoint 121 can be any suitable type of API such as a REST (Representational State Transfer) API, a GraphQL API, a SOAP (Simple Object Access Protocol) API, and/or any suitable type of API. In some embodiments, the beauty products platform 120 can expose through the API, a set of API resources which when addressed can be used for requesting different actions, inspecting state or data, and/or otherwise interacting with the beauty products platform 120. In some embodiments, a REST API and/or another type of API can work according to an application layer request and response model. An application layer request and response model can use HTTP (Hypertext Transfer Protocol), HTTPS (Hypertext Transfer Protocol Secure), SPDY, or any suitable application layer protocol. Herein HTTP-based protocol is described for purposes of illustration, rather than limitation. The disclosure should not be interpreted as being limited to the HTTP protocol. HTTP requests (or any suitable request communication) to the beauty products platform 120 can observe the principles of a RESTful design or the protocol of the type of API. RESTful is understood in this document to describe a Representational State Transfer architecture. The RESTful HTTP requests can be stateless, thus each message communicated contains all necessary information for processing the request and generating a response. The platform API can include various resources, which act as endpoints that can specify requested information or requesting particular actions. The resources can be expressed as URI's or resource paths. The RESTful API resources can additionally be responsive to different types of HTTP methods such as GET, PUT, POST and/or DELETE.

It can be appreciated that in some embodiments, any element, such as server machine 130, server machine 140, server machine 150, and/or data store 106 may include a corresponding API endpoint for communicating with APIs.

In some embodiments, the beauty products platform 120 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that may be used to provide a user with access to data or services. Such computing devices may be positioned in a single location or may be distributed among many different geographical locations. For example, beauty products platform 120 may include a plurality of computing devices that together may comprise a hosted computing resource, a grid computing resource or any other distributed computing arrangement. In some embodiments, beauty products platform 120 may correspond to an elastic computing resource where the allotted capacity of processing, network, storage, or other computing-related resources may vary over time.

In some embodiments, beauty products platform 120 can implement preview module 151. In some embodiments, lash preview module 151 can implement one or more features, operations and/or embodiments as described herein. For example, in some embodiments, a video segment of a video stream having a representation of the subject's face can be received by the beauty products platform 120 and/or preview module 151. A computer vision operation can be performed on the video segment to track one or more points (e.g., two-dimensional (2D) points) of the video segment across multiple video frames. In some embodiments, beauty products platform 120 and/or preview module 151 can receive an indication of a user selection of false eyelashes among a set of false eyelashes for preview using AR. Using the tracked points, the beauty products platform 120 and/or preview module 151 can modify the video segment to include an overlay of a 3D model of false eyelashes (e.g., virtual element) proximate the tracked points (e.g., corresponding to the eye area of the subject). The modified video segment including the overlay of the 3D model of false eyelashes proximate the tracked points can be provided to the client device 110 for presentation in real-time in an AR environment.

In some embodiments, beauty products platform 120 and in particular UI control module 124 may perform user-display functionalities of the system such as generating, modifying, and monitoring the client-side UI(s) (e.g., graphical user interface(s) (GUI)) and associated components that are presented to users of the beauty products platform 120 through UI 112 client devices 110. For example, preview module 151 via UI control module 124 can generate the UI(s) (e.g., UI 112 of client device 110) that users interact with while engaging with the beauty products platform 120.

In some embodiments, a machine learning model (e.g., also referred to as an "artificial intelligence (AI) model" herein) can include a discriminative machine learning model (also referred to as "discriminative AI model" herein), a generative machine learning model (also referred to as "generative AI model" herein), and/or other machine learning model.

In some embodiments, a discriminative machine learning model can model a conditional probability of an output for given input(s), A discriminative machine learning model can learn the boundaries between different classes of data to make predictions on new data. In some embodiments, a discriminative machine learning model can include a classification model that is designed for classification tasks, such as learning decision boundaries between different classes of data and classifying input data into a particular classification. Examples of discriminative machine learning models include, but are not limited to, support vector machines (SVM) and neural networks.

In some embodiments, a generative machine learning model learns how the input training data is generated and can generate new data (e.g., original data). A generative machine learning model can model the probability distribution (e.g., joint probability distribution) of a dataset and generate new samples that often resemble the training data. Generative machine learning models can be used for tasks involving image generation, text generation and/or data synthesis. Generative machine learning models include, but are not limited to, gaussian mixture models (GMMs), variational autoencoders (VAEs), generative adversarial networks (GANs), large language models (LLMs), visual language models (VLMs), multi-modal models (e.g., text, images, video, audio, depth, physiological signals, etc.), and so forth.

Training of and inference using discriminative machine learning models and generative machine learning models is described herein. It should be noted that although the training of and inference using discriminative machine learning model and generative machine learning model are described separately for the purposes of clarity, it can be appreciated that elements described with respect to discriminative machine learning models can apply to generative machine learning models, and vice versa, unless otherwise described.

In some embodiments, some elements of FIG. 1A, such as training set generator 131 of sever machine 130, training engine 141 of server machine 140, and model 160 can apply to a discriminative machine learning model, unless otherwise described.

Server machine 130 includes a training set generator 131 that is capable of generating training data (e.g., a set of training inputs and a set of target outputs) to train a model 160 (e.g., a discriminative machine learning model). In some embodiments, training set generator 131 can generate the training data based on various data (e.g., stored at data store 106 or another data store connected to system 100A via network 104). Data store 106 can store metadata associated with the training data.

Server machine 140 includes a training engine 141 that is capable of training a model 160 using the training data from training set generator 131. The model 160 (also referred to "machine learning model" or "artificial intelligence (AI) model" herein) may refer to the model artifact that is created by the training engine 141 using the training data that includes training inputs (e.g., features) and corresponding target outputs (correct answers for respective training inputs) (e.g., labels). The training engine 141 may find patterns in the training data that map the training input to the target output (the answer to be predicted) and provide the model 160 that captures these patterns. The model 160 may be composed of, e.g., a single level of linear or non-linear operations (e.g., a support vector machine (SVM), or may be a deep network, i.e., a machine learning model that is composed of multiple levels of non-linear operations). An example of a deep network is a neural network with one or more hidden layers, and such machine learning model may be trained by, for example, adjusting weights of a neural network in accordance with a backpropagation learning algorithm or the like. Model 160 can use one or more of a support vector machine (SVM), Radial Basis Function (RBF), clustering, supervised machine learning, semi-supervised machine learning, unsupervised machine learning, k-nearest neighbor algorithm (k-NN), linear regression, random forest, neural network (e.g., artificial neural network), a boosted decision forest, etc. For convenience rather than limitation, the remainder of this disclosure describing discriminative machine learning model will refer to the implementation as a neural network, even though some implementations might employ other type of learning machine instead of, or in addition to, a neural network.

In some embodiments, such as with a supervised machine learning model, the one or more training inputs of the set of the training inputs are paired with respective one or more training outputs of the set of training outputs. The training input-output pair(s) can be used as input to the machine learning model to help train the machine learning model to determine, for example, patterns in the data.

In some embodiments, training data, such as training input and/or training output, and/or input data to a trained machine learning model (collectively referred to as "machine learning model data" herein) can be preprocessed before providing the aforementioned data to the (trained or untrained) machine learning model (e.g., discriminative machine learning model and/or generative machine learning model) for execution. Preprocessing as applied to machine learning models (e.g., discriminative machine learning model and/or generative machine learning model) can refer to the preparation and/or transformation of machine learning model data.

In some embodiments, preprocessing can include data scaling. Data scaling can include a process of transforming numerical features in raw machine learning model data such that the preprocessed machine learning model data has a similar scale or range. For example, Min-Max scaling (Normalization) and/or Z-score normalization (Standardization) can be used to scale the raw machine learning model. For instance, if the raw machine learning model data includes feature representing temperatures in Fahrenheit, the raw machine learning model data can be scaled to a range of [0, 1] using Min-Max scaling.

In some embodiments, preprocessing can include data encoding. Encoding data can include a process of converting categorical or text data into a numerical format on which a machine learning model can efficiently execute. Categorical data (e.g., qualitative data) can refer to a type of data that represents categories and can be used to group items or observations into distinct, non-numeric classes or levels. Categorical data can describe qualities or characteristics that can be divided into distinct categories, but often does not have a natural numerical meaning. For example, colors such as red, green, and blue can be considered categorical data (e.g., nominal categorical data with no inherent ranking). In another example, "small," "medium," and "large" can be considered categorical data (ordinal categorical data with an inherent ranking or order). An example of encoding can include encoding a size feature with categories ["small," "medium," "large"] by assigning 0 to "small," 1 to "medium," and 2 to "large."

In some embodiments, preprocessing can include data embedding. Data embedding can include an operation of representing original data in a different space, often of reduced dimensionality (e.g., dimensionality reduction), while preserving relevant information and patterns of the original data (e.g., lower-dimensional representation of higher-dimensional data). The data embedding operation can transform the original data so that the embedding data retains relevant characteristics of the original data and is more amenable for analysis and processing by machine learning models. In some embodiments embedding data can represent original data (e.g., word, phrase, document, or entity) as a vector in vector space, such as continuous vector space. Each element (e.g., dimension) of the vector can correspond to a feature or property of the original data (e.g., object). In some embodiments, the size of the embedding vector (e.g., embedding dimension) can be adjusted during model training. In some embodiments, the embedding dimension can be fixed to help facilitate analysis and processing of data by machine learning models.

In some embodiments, the training set is obtained from server machine 130. Server machine 150 includes a preview module 151 that provides current data (e.g., 2D image data, etc.) as input to the trained machine learning model (e.g., model 160) and runs the trained machine learning model (e.g., model 160) on the input to obtain one or more outputs.

In some embodiments, confidence data can include or indicate a level of confidence of that a particular output (e.g., output(s)) corresponds to one or more inputs of the machine learning model (e.g., trained machine learning model). In one example, the level of confidence is a real number between 0 and 1 inclusive, where 0 indicates no confidence that output(s) corresponds to a particular one or more inputs and 1 indicates absolute confidence that the output(s) corresponds to a particular one or more inputs. In some embodiments, confidence data can be associated with inference using a machine learning model.

In some embodiments, machine learning model, such as model 160, may be (or may correspond to) one or more computer programs executed by processor(s) of server machine 140 and/or server machine 150. In other embodiments, machine learning model may be (or may correspond to) one or more computer programs executed across a number or combination of server machines. For example, in some embodiments, machine learning models may be hosted on the cloud, while in other embodiments, these machine learning models may be hosted and perform operations using the hardware of a client device 110. In some embodiments, the machine learning models may be a self-hosted machine learning model, while in other embodiments, machine learning models may be external machine learning models accessed by an API.

In some embodiments, server machines 130 through 150 can be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components that can be used to provide a user with access to one or more data items of the beauty products platform 120. The beauty products platform 120 can also include a website (e.g., a webpage) or application back-end software that can be used to provide users with access to the beauty products platform 120.

In some embodiments, one or more of server machine 130, server machine 140, model 160, server machine 150 can be part of beauty products platform 120. In other embodiments, one or more of server machine 130, server machine 140, server machine 150, or model 160 can be separate from beauty products platform 120 (e.g., provided by a third-party service provider).

Also as noted above, for purpose of illustration, rather than limitation, aspects of the disclosure describe the training of a machine learning model (e.g., model 160) and use of a trained machine learning model (e.g., model 160). In other embodiments, a heuristic model or rule-based model can be used as an alternative. It should be noted that in some other embodiments, one or more of the functions of beauty products platform 120 can be provided by a greater number of machines. In addition, the functionality attributed to a particular component of the beauty products platform 120 can be performed by different or multiple components operating together. Although embodiments of the disclosure are discussed in terms of beauty products platforms, embodiments can also be generally applied to any type of platform or service.

Figure 1B:
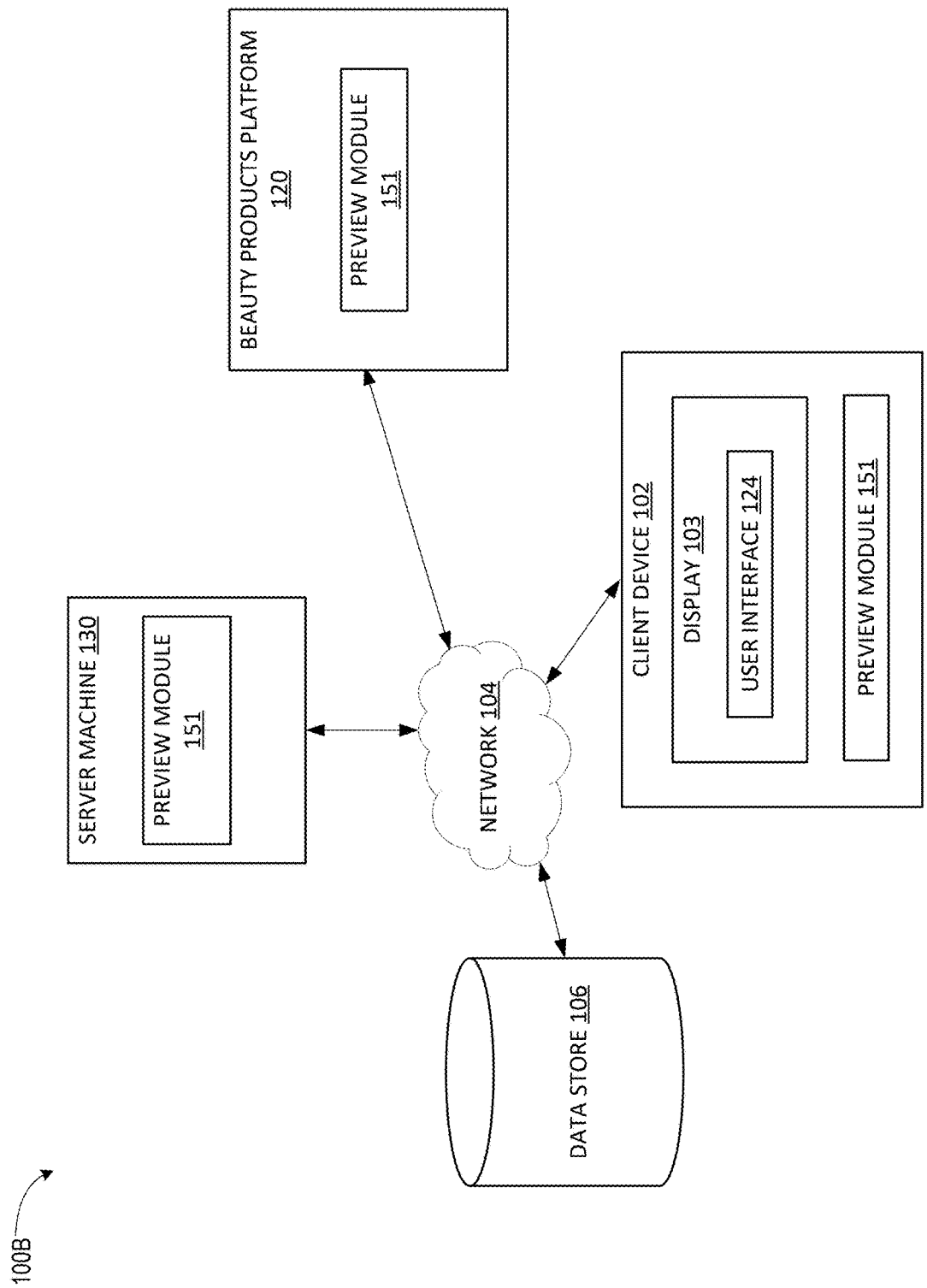
FIG. 1B illustrates an example system architecture, in accordance with embodiments of the disclosure.

FIG. 1B illustrates an example system architecture 100B, in accordance with embodiments of the disclosure. The system architecture 100 (also referred to as "system" herein) includes one or more client devices 110 a data store 106, a beauty products platform 120, and a server machine 130, each connected to a network 104. It can be noted that elements of system 100A can be used to help describe elements system architecture 100B (also referred to as "system 100B" herein). For the sake of clarity and brevity, the description of elements of FIG. 1A can similarly apply to corresponding elements of FIGS. 1B and 1s not repeated here. It can be further noted the description of FIG. 1A can similarly apply to FIG. 1B, unless otherwise described, and is not repeated here for the sake of clarity and brevity.

Beauty products platform 120 can enable the user(s) of client device(s) 102A to use AR features to receive previews for application of artificial lash extensions (e.g., via a preview module 151). Using AR to implement previews of artificial lash extensions can include real-time modifications to a video segment including overlays of 3D models of false eyelashes, in which users can view the video segment with the overlays of 3D models of false eyelashes on the client device also in real-time. Real-time video or live video can refer to the capture, process and/or transmission of video data that allows recipients to view an event as the event occurs (and without noticeable or appreciable latency, e.g., within milliseconds to a couple seconds). Augmented reality (AR) can refer to techniques used to overlay digital information, such as images, videos, or 3D models, onto the real world images and/or videos. AR can be implemented through devices like smartphones, tablets, or specialized AR glasses. Blending of virtual content with a user's environment can enhance the user's perception of reality, allowing for interactive and immersive experiences in various applications (e.g., such as beauty products previews). For example, AR can be used to enhance video content by overlaying virtual elements onto live video streams.

Video, captured by a camera or video recorder, can refer to a series of multiple video segments, which are subsets (e.g., subset of video frames) of an entire video (e.g., video stream), defined by specific start and end points within the video's duration. Video segments can be distinguished by thematic or temporal changes and are composed of numerous consecutive video frames. The smallest portion of a video is a video frame, which is similar to still 2D image. Video streams, on the other hand, refer to the continuous transmission of video data over the internet or other networks, allowing for the real-time or on-demand viewing of videos (e.g., without downloading an entire video file).

Real-time in the context of VR can refer to the application of VR features instantly without transmission delays and/or with negligible (e.g., milliseconds or microseconds) latency. Real-time video or live video can refer to the capture, process and/or transmission of video data that allows recipients to view an event as the event occurs (and without noticeable or appreciable latency, e.g., within milliseconds to a couple seconds). For example, in a real-time AR preview of artificial lash extensions segments of a video stream from the client device are modified to include overlays of 3D models of false eyelashes while the user views the video stream in real-time. In some embodiments, beauty products platform 120 can allow a user to use the client device 110 to capture a video segment of the user, modify the video segment and provide a modified video segment with an overlay of the 3D model of false eyelashes (e.g., artificial lash extensions). The modified video segment with the overlay of the 3D model of false eyelashes can be presented at the client device for the subject to view as an AR artificial lash extension preview.

A virtual element can refer to a digital object or entity that is overlaid onto a video (or still image). A virtual element can include 3D models, text, images, animations or other graphical content. In AR, the virtual element can be overlaid onto video representing the real-world environment. In some embodiments, overlays of 3D models in the context of AR can refer to visual elements, such as designs or objects overlaid on video (e.g., video data such as video frame(s)) of a video). In some embodiments, overlays of 3D models include digital information rendered as visual elements or virtual elements. In some embodiments, overlays of 3D models of can be used to show, inform, and/or enhance a viewer's understanding of the potential look of a beauty product. In some embodiments, overlays of 3D models (e.g., of false eyelashes) are made to look realistic so as to give a user an accurate idea of what the beauty product (e.g., artificial lash extensions) will look like once applied. An overlay of a 3D model on can be referred to a type of virtual element, in some embodiments.

In some embodiments, the 3D model (e.g. 3D virtual element) used as an overlay on 2D video data or 2D image data can be rendered as a 2D representation overlaid on the 2D video data or 2D image data. For example, the underlying 3D virtual element can be three-dimensional, but is flattened (2D) when displayed on screen. In some embodiments, the 3D model can be rendered as a 3D object overlaid on the 2D video data or 2D image data.

In some embodiments, a 3D model is a three-dimensional digital representation of a scene or object. In some embodiments, the 3D model can be derived or generated using a respective 2D image (e.g., a 2D image represented by 2D image data). In some embodiments, 3D model data of a 3D model can include width information, height information, and depth information of the scene and/or object. The 3D model data can include geometric data that describes the corresponding scene or object. The geometric data can include one or more of vertices (e.g., points), edges, and/or faces. In some embodiments, vertices (e.g., nodes or points) can include points of a 3D model. A vertex can have 3D coordinates (e.g., x-, y-, and z-coordinates). The vertex can identify a location where one or more edges intersect. In some embodiments, an edge can include a line, such as a straight line and connect at least two vertices. In some embodiments, faces can include surfaces, such as planar surfaces, connecting edges (e.g., closed-loop edges). In some embodiments, one or more of vertices, edges and faces can define the geometry of a 3D model.

In some embodiments, the 3D model data of a 3D model can include texture information that describes an object's surface texture. In some embodiments, 3D model data does not include texture information. In some embodiments, 3D model data includes material information that can influence the appearance of a 3D model at rendering (e.g., how light reflects from the material). In some embodiments, 3D model data does not include material information. In some embodiments, the 3D model data includes lighting information that describes the interaction of light (and absence of light) with the scene or object. In some embodiments, 3D model data does not include lighting information. In some embodiments, 3D model data includes color information that indicates the colors of surface (e.g., faces) of a 3D model.

In some embodiments, a 3D model can be used as an overlay (e.g., for enhancing 2D video frames with previews of beauty products).

In some embodiments, a 3D model can represent of an eye area of a subject and can include landmarks, such as a nose bridge, tip of nose, inner corner of eye etc. In some embodiments, the 3D model of an eye area of a subject can be rendered as a transparent or semi-transparent overlay allowing for integration of the 3D model with 2D images (e.g., 2D video frames). In some embodiments, a generic 3D model can be modified to match the unique characteristics of an individual's face (e.g., accurately reflecting the facial features of the subject).

In some embodiments, 3D landmark data can include data that represents one or more 3D landmarks corresponding to one or more facial features of a human face (e.g., represented by 2D facial feature data). In some embodiments, 3D landmark data can correspond to associated 2D facial feature data (e.g., represent the same facial feature). In some embodiments, 3D landmark data can identify one or more 3D points (e.g., vertices of the 3D model data) that represent a respective facial feature represented by the 2D facial feature data 242. For example, the nose of a subject can be represented by a single 3D point (and corresponding 2D point of the 2D facial feature data) at the tip of the nose, or by multiple 3D points (and corresponding 2D points of the 2D facial feature data) along the bridge of the nose, the tip of the nose, and/or outline of the nose.

In some embodiments, the 3D landmark data can include 3D coordinate data that represents the 3D points, such as x-coordinate, y-coordinate, and z-coordinate information identifying the one or more 3D points (e.g., vertices) in three-dimensional space. In some embodiments, the 3D landmark data can include textual identifiers of respective facial features represented by one or more 3D points. For example, a 3D landmark that represents a nose can include or be associated with a textual identifier, "nose." In some embodiments, the 3D landmarks identified by the 3D landmark data that correspond to facial features represented by the 2D facial feature data can be referred to as "target 3D landmarks" or "3D landmarks" herein.

In some embodiments, the 3D landmark data can correspond to a respective 3D model represented by a 3D model data. For example, each 3D model can include a respective instance of 3D landmark data.

Figure 8:
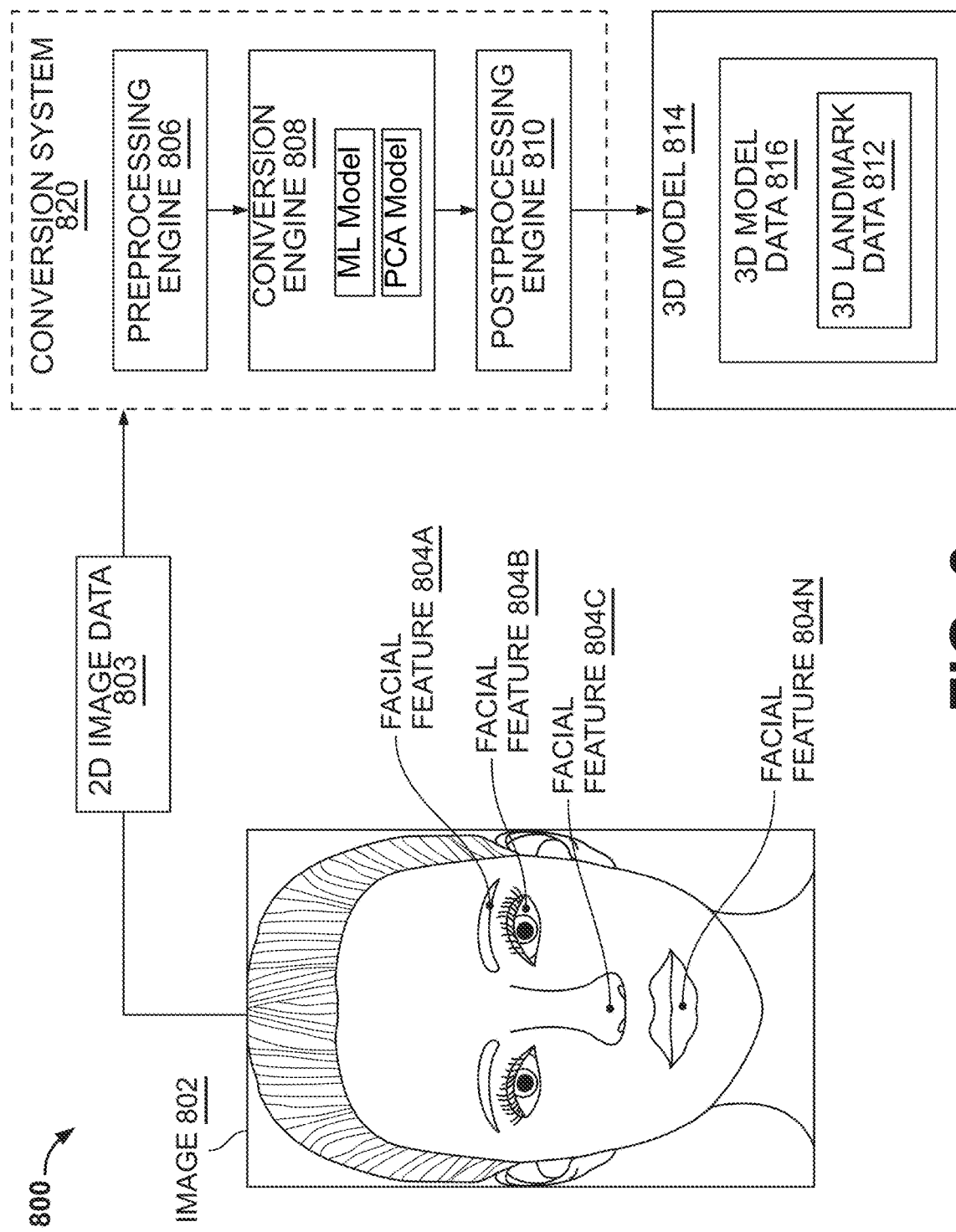
FIG. 8 is a block diagram of an example conversion system architecture for providing conversion of 2D image data corresponding to a 2D image to a corresponding 3D model, in accordance with aspects of the disclosure.

Conversion of 2D image data representing a 2D image to a corresponding 3D model are further described with respect to FIG. 8. Details of 3D models of a face of a subject including landmarks are further described with respect to FIG. 9.

In some embodiments, 2D image data can represent an image of a scene. In some embodiments, a scene can include one or more objects, such as an image of a person. In some embodiments, 2D image data can represent an image of a subject's face or a part of the subject's face (e.g., an image of a subject's eye area). In some embodiments, 2D image data can represent a frontal face image. A frontal face image can refer to an image taken from a front-facing perspective. For instance, in a frontal face image the subject can look directly at the camera.

In some embodiments, 2D image data can represent a still image. In some embodiments, 2D image data can represent one or more video frames of a video, such as video frames of a video stream. In some embodiments, 2D image data can include 2D coordinate information of points (e.g., pixels) of the 2D image (e.g., x- and y-coordinates). In some embodiments, a 2D image can lack depth information (e.g., depth information measured by a depth camera). In some embodiments, 2D image data can include digital data (e.g., pixels) representing a digital image. In some embodiments, a 2D image may be represented in various formats such as joint photographic experts group (JPEG), portable network graphics (PNG), tag image file format (TIFF), etc. In some embodiments, 2D image data may include color information by for example, using values of a color model such as a red, green, blue (RGB) color model or other color model.

In some embodiments, 2D image data may identify one or more facial features of a face of a subject. A facial feature can refer to a physical characteristic or element that is part of a human face. Facial features can include, but are not limited to the lips, nose, tip of the noise, bridge of the nose, eyes, inner eye, pupil, eyelids, eyebrows, inner eyebrow, outer eyebrow, center eyebrow, cheeks (e.g., cheek bones, etc.), jaw (e.g., jawline, etc.), and/or other facial features.

In some embodiments, the 2D image data can have fixed dimensional values (e.g., fixed width, height, and color depth, such as 24-bit). In some embodiments, the 2D image data can have variable dimensional values. In some embodiments, the 2D image data does not include depth information. In some embodiments, the 2D image data can include metadata such as a timestamp, location information indicating where an image was taken, image sensor specifications, facial feature coordinates and identifiers, etc.

In some embodiments, 2D facial feature data can include data that represents one or more facial features of a human face. In some embodiments, the 2D facial feature data can correspond to a respective 2D image represented by 2D image data. For example, each 2D image (represented by 2D image data) can include a respective instance of 2D facial feature data. In another example, one or more facial features represented in a 2D image can be identified by respective 2D facial feature data. In some embodiments, for each of the facial features represented by the 2D facial feature data, the 2D facial feature data can identify one or more 2D points (e.g., pixels of the 2D image data) that represent a respective facial feature. For instance, the nose of can be represented by a single 2D point at the tip of the nose, or by multiple 2D points along the bridge of the nose, the tip of the nose, and/or outline of the nose. In some embodiments, the 2D facial feature data can include 2D coordinate data that represent the 2D points, such as x-coordinate and y-coordinate information identifying the one or more 2D points (e.g., pixels). In some embodiments, the 2D facial feature data can include textual identifiers of respective facial features represented by one or more 2D points (e.g., points X through Z represent the bridge of the nose). In some embodiments, the 2D facial feature data can include color data for the 2D points. For example, the color data for a 2D point can be expressed in values of the RGB model. It can be noted that points as described with respect to 2D information, such as 2D image data and 2D facial features data, 2D geometric data, and 2D facial feature relationship data can also be interchangeably described as pixels, herein, unless otherwise described.

In some embodiments, data store 106 is a persistent storage that is capable of storing data as well as data structures to tag, organize, and index the data. A data item can include video stream data and/or audio data, in accordance with embodiments described herein. In some embodiments, data store 106 can include 2D image data, 2D facial feature data, 2D geometric data, 2D facial feature relationship data, 3D model data, 3D landmark data, 3D geometric data, 3D landmark relationship data, etc. Data store 106 can be hosted by one or more storage devices, such as main memory, magnetic or optical storage-based disks, tapes or hard drives, NAS, SAN, and so forth. In some embodiments, data store 106 can be a network-attached file server, while in other embodiments data store 106 can be some other type of persistent storage such as an object-oriented database, a relational database, and so forth, that may be hosted by beauty products platform 120 or one or more different machines (e.g., the server machine 130) coupled to the beauty products platform 120 via network 104. In some embodiments, the data store 106 can store portions of video streams and audio received from the client device(s) 102A for the beauty products platform 120.

In some embodiments, client device 110 can include a visual component (e.g., a camera) that can generate video data to be streamed to beauty products platform 120. In some embodiments, the visual component can also include an image capture device (e.g., a camera) to capture images and generate video data (e.g., a video stream) of the captured data of the captured images. In some embodiments, client device 110 can transmit the generated video stream to beauty products platform 120.

Client device 110 can include a web browser and/or a client application (e.g., a mobile application, a desktop application, etc.). In some embodiments, the web browser and/or the client application can present, on a display device 103 of client device 110, a user interface (UI) (e.g., a UI of the UIs 124) for users to access beauty products platform 120. For example, a user of client device 110 can receive previews for application of artificial lash extensions via a UI 124 presented on the display device 103 by the web browser or client application.

In general, functions described in embodiments as being performed by beauty products platform 120 or server machine 130 can also be performed by the client device 110 in other embodiments, if appropriate. In addition, the functionality attributed to a particular component can be performed by different or multiple components operating together. Beauty products platform 120 and/or server machine 130 can also be accessed as a service provided to other systems or devices through appropriate application programming interfaces, and thus is not limited to use in websites.

Although embodiments of the disclosure are discussed in terms of beauty products platform 120 and users of lash beauty products platform 120 receiving a real-time AR or VR tutorial for application of artificial lash extensions, embodiments may also be generally applied to any type of tutorial for application of beauty products. Embodiments of the disclosure are not limited to AR or VR previews for application of beauty products.

In embodiments of the disclosure, a "user" may be represented as a single individual. However, other embodiments of the disclosure encompass a "user" being an entity controlled by a set of users and/or an automated source.

Figure 2:
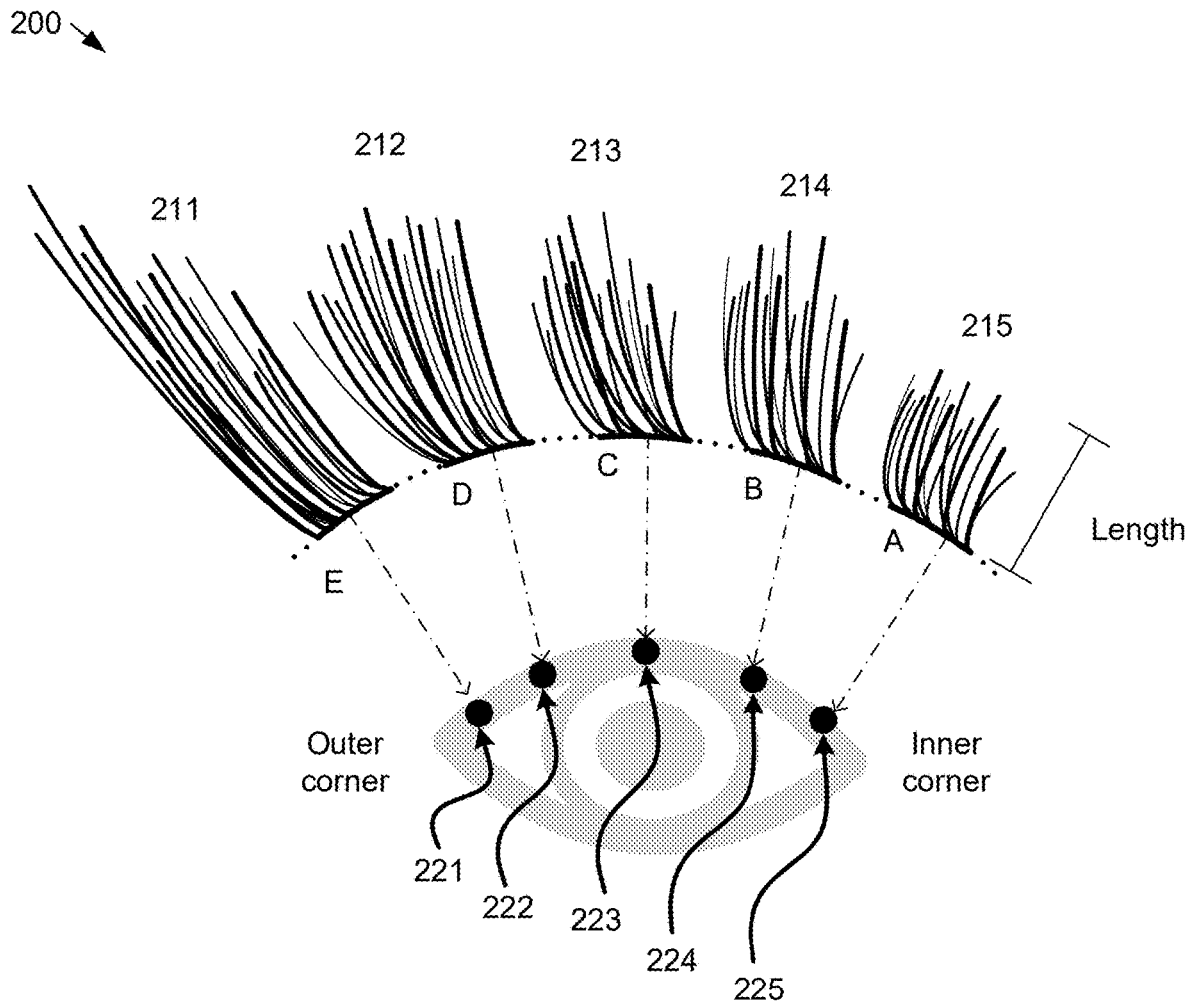
FIG. 2 depicts an arrangement of artificial lash extensions in accordance with lash configuration information, in accordance with some embodiments.

FIG. 2 depicts an arrangement of artificial lash extensions in accordance with lash configuration information, in accordance with some embodiments. Set of artificial lash extensions 200 illustrates artificial lash extensions 211 through 215. The description of lash configuration information with respect to artificial lash extensions is provided for purposes of illustration, rather than limitation. It can be noted that in other embodiments, lash configuration information can be implemented for false eyelashes, generally. It can be further noted that in other embodiments, a set of artificial lash extensions can have any number of artificial lash extensions. For purposes of illustration, rather than limitation a set of artificial lash extensions with respect to FIG. 2 is described as for a single eye. It can also be noted that in other embodiments that a set of artificial lash extensions can be for a pair of eyes, multiple eyes, or object or configurations.

Lash configuration information (also referred to as "lash map" herein) can refer to information related to the selection of artificial lash extensions and/or the application of artificial lash extensions at the eye area of a user. In some embodiments, lash configuration information can identify the particular artificial lash extensions of a set of lash extensions (e.g., length, style, and/or color), a location at the underside of the natural lashes at which each particular artificial lash extension of the set of artificial lash extensions is to be applied, and/or the order of each artificial lash extension in the set of artificial lash extensions. In some embodiments and as described further below, lash configuration information can include one or more of style information, length information, color information, placement information, or order information for an eye or pair of eyes of a user. An example of lash configuration information is illustrated in element 235. Although described with respect to artificial lash extensions for purposes of illustration, rather than limitation, lash configuration information can apply to false eyelashes, generally, in some embodiments.

In some embodiments, lash configuration information can be specific to a particular user. In some embodiments, lash configuration information can pertain to single eye where each eye of a pair of eyes can have different lash configuration information. In some embodiments, lash configuration information can pertain to a pair of eyes where each eye has the same or similar lash configuration information. In some embodiments, a set of artificial lash extension can include multiple artificial lash extensions for a single eye or a pair of eyes.

In some embodiments, lash configuration information includes style information. In some embodiments, style information can identify a style of one or more artificial lash extensions in a set of artificial lash extension. The style of an artificial lash extension can refer to a particular design of an artificial lash extension and/or a desired appearance of an arranged set of artificial lash extensions. In some embodiments, style or design of an artificial lash extension can include a particular arrangement or pattern of artificial hairs of an artificial lash extension.

For example, artificial lash extensions 211 through 215 show artificial lash extensions of the set of artificial lash extensions 200 in a same style, style X (e.g., style information is style X). The artificial lash extensions of style X can have the same or similar arrangement (e.g., pattern) of artificial hairs. In other examples, one or more artificial lash extensions of a set of artificial lash extensions can be of different styles from other artificial lash extensions of the set of artificial lash extensions. For instance, artificial lash extension 213 can be of style P that is pointed at the ends (not shown) and the remining artificial lash extensions 211, 212, 23 and 215 can be of style X.

In some embodiments, the style of the artificial lash extensions in a set of artificial lash extensions can be the same or similar. In some embodiments, the style among at least some of the artificial lash extensions in a set of artificial lash extensions can be of one or more different styles. Styles can include, for example, natural style (e.g., moderate curl and volume), volume style (e.g., extra volume and pronounced curl), mega-volume style (e.g., deep curl and densely packed volume), classic style (e.g., moderate curl and balanced volume), wispy style (e.g., feathered, fine extensions that create a textured and soft appearance), spiky style (e.g., separated, uneven extensions with a jagged, textured look), crimped style (e.g., extensions that are intentionally crimped or zigzagged), etc.

In some embodiments, lash configuration information includes length information. Length information can refer to the length of an artificial lash extension. In some instances, length can be measured from the base to tip of the artificial hairs of the artificial lash extension (e.g., the tip of the longest artificial hair of the artificial lash extension). In some embodiments, the lengths of the artificial lash extensions in a set of artificial lash extensions can be the same length. In some embodiments, the lengths of the set of artificial lash extensions in a set of artificial lash extensions can be varying lengths. In some embodiments, the lengths of an artificial lash extension can range from 6 millimeters (mm) to 25 mm or 8 mm to 20 mm.

For example, artificial lash extension 211 can be 12 mm in length, artificial lash extension 212 can be 11 mm in length, artificial lash extension 213 can be 10 mm in length, artificial lash extension 214 can be 9 mm in length, and artificial lash extension 215 can be 8 mm in length. The length information can be 8 mm, 9 mm, 10 mm, 11 mm, 12 mm for the set of artificial lash extensions 200, for instance. In another example, the artificial lash extensions in a set of artificial lash extensions can be the same length and the corresponding length information can be 9 mm, 9 mm, 9 mm, 9 mm, 9 mm, for instance.

In some embodiments, varying lengths of the artificial lash extension within a lash configuration can be strategically used to create different desired appearances (e.g., looks). Varying lengths can be used to achieve, for example, a natural, textured appearance with mixed lengths or to add dimension by incorporating longer and shorter lashes within the same set of artificial lash extensions. In further examples, varying lengths can be used to achieve appearances such as a cat-eye appearance (e.g., longer extensions towards the outer corners of the eyes, creating an uplifted and elongated effect reminiscent of the eye shape of a cat), a doll-eye appearance (e.g., longer lashes at the center of the eye, producing a wide-eyed look), textured appearance (e.g., a mix of different lash lengths and types for a multidimensional look), cleopatra appearance (e.g., extended, winged extensions at the outer corners of the eye), etc.

In some embodiments, lash configuration information includes color information. Color information can refer to the color(s) of an artificial lash extension. In some embodiments, artificial lash extensions in a set of artificial lash extensions 200 can be the same color. In some embodiments, artificial lash extensions in a set of artificial lash extensions 200 can be different colors. Colors can include, for example, black, blonde, auburn, blue, green, purple, pink, and so forth. In some embodiments, an artificial lash extension can include multiple colors. For example, multi-colored lash extensions can include ombre (e.g., gradual transition of color from base to tip of the artificial hairs of dark to light or one color to another), rainbow (e.g., designed with multiple colors in a spectrum), sunset (e.g., warm and fiery hues of a sunset, blending colors like red, orange, and pink), etc. In some embodiments, a user can match the color of the artificial lash extensions of set of artificial lash extensions 200 with the color of the user's eyebrows, head hair or other feature.

In some embodiments, lash configuration information includes order information. Order information can refer to information identifying for an artificial lash extension of a set of artificial lash extensions a position in an order (e.g., sequence) of an arrangement of the set of artificial lash extensions. The order information can identify relative position of each artificial lash extension of the set of artificial lash extensions 200 with respect to one another. For example, artificial lash extensions 215, 214, 213, 212, and 211 are to be ordered as A, B, C, D, E respectively. The order information for artificial lash extension 215 can reflect position A in the order of the arrangement. The order information for artificial lash extension 214 can reflect position B, and so forth.

In some embodiments, lash configuration information includes location information. Location information can include information identifying a location of the eye area where an artificial lash extension of a set of artificial lash extensions is to be applied. For example, artificial lash extensions 215, 214, 213, 212, and 211 are to be located at points 225, 224, 223, 222, and 221 respectively. In some embodiments, the location information can include information that identifies a location on the natural lashes (e.g., a location at the underside of the natural lashes) at which an artificial lash extension of the set of artificial lash extension is to be applied. In some embodiments, location information can help guide a user on applying the set of artificial lash extension at the natural lashes. In some embodiments, the location information can include a visible guide (e.g., picture of identifying location(s) at which to apply one or more artificial lash extensions). In some embodiments, the location information can include descriptive information, such as textual information, describing a location at which to apply an artificial lash extension. For instance, location information for artificial lash extension 215 can include information that artificial lash extension 215 is to be applied at the inner corner of the right eye. Location information for artificial lash extension 214 can include information indicating that artificial lash extension 214 is to be applied directly adjacent to artificial lash extension 215, and so forth.

Figure 3:
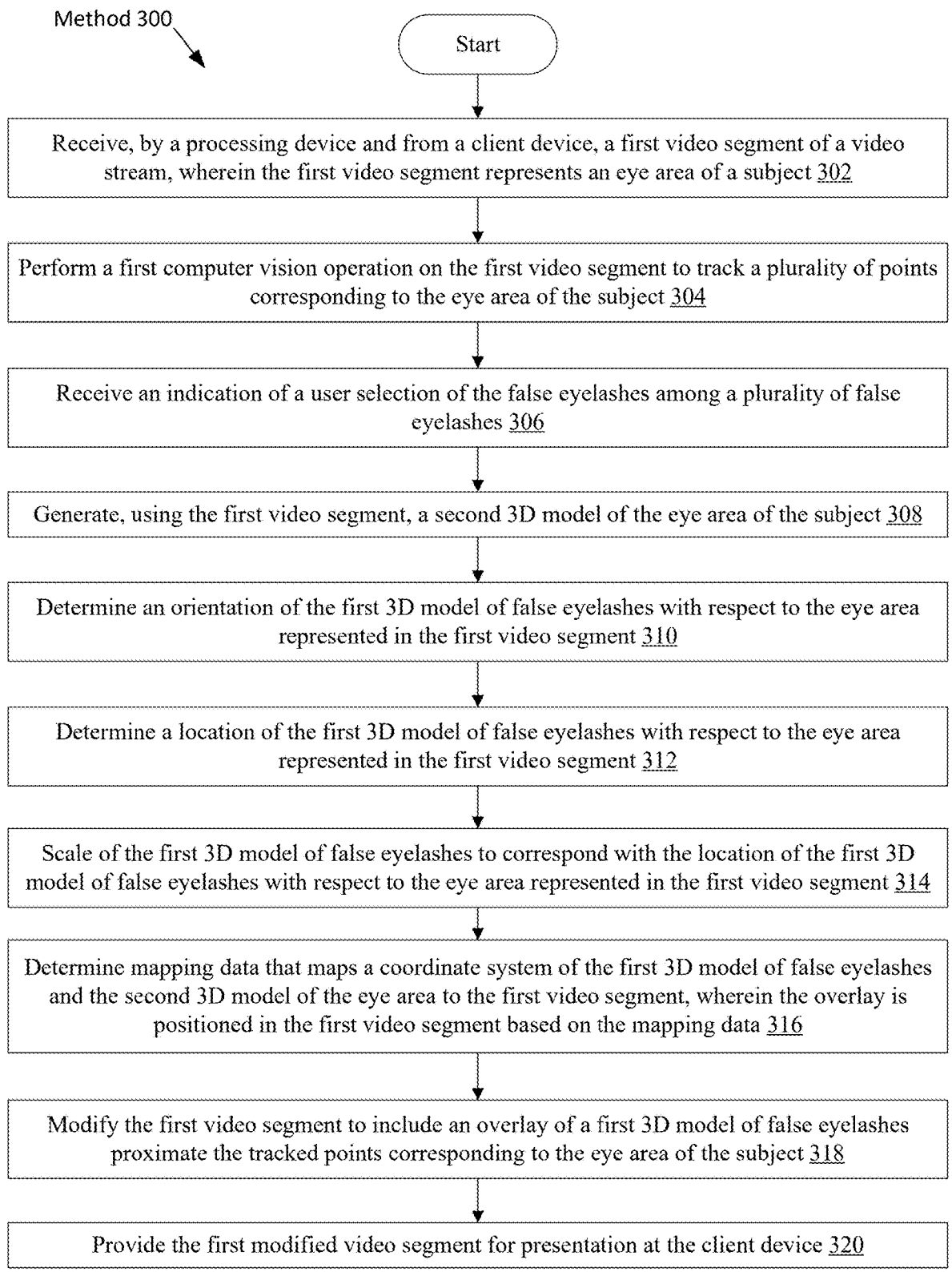
FIG. 3 illustrates a flow diagram of an example method using augmented reality (AR) to preview artificial lash extensions, in accordance with some embodiments.

FIG. 3 illustrates a flow diagram of an example method 300 for using augmented reality to preview artificial lash extensions, in accordance with some embodiments. Method 300 may be performed by processing logic that may comprise hardware (e.g., circuitry, dedicated logic, etc.), computer-readable instructions such as software or firmware (e.g., run on a general-purpose computing system or a dedicated machine), or a combination thereof. Method 300 may also be associated with sets of instructions stored on a non-transitory computer-readable medium (e.g., magnetic or optical disk, etc.). The instructions, when executed by a processing device, may cause the processing device to perform operations of method 300. In an embodiment, the operations of method 300 are performed by computing system 1200 of FIG. 12. In some embodiments, the operations of method 300 are performed by preview module 151 of FIG. 1A-1B. In an embodiment, operations of a particular method depicted in FIG. 3 can be performed simultaneously or in different orders than depicted. Various embodiments may include additional operations not depicted in FIG. 3 or a subset of operations depicted in FIG. 3. In some embodiments, method 300 can be performed with the same, different, fewer, or more operations in the same or different order.

At block 302, processing logic receives, from a client device, a first video segment of a video stream. The first video segment can represent an eye area of a subject.

At block 304, the processing logic performs a first computer vision operation on the first video segment to track a set of points corresponding to the eye area of the subject. In some embodiments, the set of points can be points (e.g., 2D points or pixels) on video frames of the first video segment.

In some embodiments, a computer vision operation can include one or more operations that interpret visual data (e.g., video data such as a video segment including multiple frames) and/or audio data of a video segment. In some embodiments, a computer vision operation can include one or more operations that interpret visual data of a modified video segment (e.g., a video segment including an overlay of a 3D model of false eyelashes). In some embodiments, a computer vision operation can include using the visual data, such a some or all the features of a video segment of a video stream, and/or audio data to identify and classify objects (e.g., including overlays of 3D models) represented the image or video.

In some embodiments, a computer vision operation can track a set of points corresponding to the eye area of the subject. In some embodiments, the computer vision operation can identify and interpret one or more of facial positioning (e.g., face position estimation, eye area position estimation, etc.), facial feature positioning and natural eyelash positioning (e.g., natural eyelash position estimation, etc.) using the visual data of a video segment. In some embodiments, the 3D model of false eyelashes (e.g., virtual element representing false eyelashes) can be positioned and re-positioned based on the tracking the position and/or change in position of one or more of the set of points or other features of the video segment. In some embodiments, the computer vision operation can track an overly of a 3D model of false eyelashes.

In some embodiments, the computer vision operation can detect changes in one or more of natural eyelash position, face position, eye area position, or other positionings of other objects between frames of a video segment. In some embodiments, the computer vision operation can track a set of points corresponding to the eye area of the subject. In some embodiments, the changes in positions can be used to re-position the 3D model of false eyelashes (e.g., virtual element representing false eyelashes).

In some embodiments, machine learning techniques such as machine learning models trained on training data that pairs inputs within known outputs is implemented to perform a computer vision operation for position recognition and point tracking. In some embodiments, the trained machine learning model can use as input information identifying the visual features of the frames of the video segment and output a level of confidence (e.g., a probability indicated by a number between zero and one) that the visual features represent that the set of points corresponding to the eye area of the subject are being accurately tracked correctly and/or a level of confidence that one or more points corresponding to a user placement of a 3D model of false eyelashes (e.g., to track a point(s) corresponding to a user placement of a 3D model of false eyelashes) is accurately being tracked. In some embodiments and as noted above, a computer vision operation can implement one or more of natural eyelash position estimation, face position estimation, eye area position estimation, positioning of other objects or a combination thereof to detect changes in one or more of natural eyelash, facial feature and/or facial positions for tracking one or more points corresponding to a user placement of a 3D model of false eyelashes, and/or a set of points corresponding to the eye area of the subject. In some embodiments, natural eyelashes, eye area, and/or face position estimation can estimate the position (and changes in position) where a set of points are located with respect to frames of a video segment. In some embodiments, eye area position estimation can determine or estimate the orientation of the 3D model of an eye area of a human face of a subject in relation to a 3D model of false eyelashes. In some embodiments, a computer vision operation that implements eye area position estimation can analyze images or video containing visual features representing the subject's face including the eye area to identify the position of the eye area (e.g., features thereof) and position, orientate, and/or scale the 3D model of false eyelashes with respect to the eye area. In some embodiments, natural eyelash position estimation can determine or estimate the orientation of the natural eyelashes, eye area, and/or face of the subject. In some embodiments, a computer vision operation that implements natural eyelash position estimation can analyze images or video containing visual features representing the subject's face to identify the position of one or more of the natural eyelashes, eye area, and/or face of the subject, and/or features thereof. In some embodiments, facial feature position estimation can determine or estimate the orientation of the facial features of the subject. In some embodiments, a computer vision operation that implements facial feature position estimation can analyze images or video containing visual features representing the subject's face to identify the position of one or more facial features of the subject.

In some embodiments, natural eyelash position estimation (as well as other position estimations) can include determining the orientation or position of natural eyelashes of a subject in 2D or 3D space. In some embodiments, a computer vision operation implementing natural eyelash position estimation, eye area position estimation, facial feature position estimation and/or face position estimation can analyze images or video containing visual features representing a face of a subject, eye area, the natural eyelashes and/or other facial features to estimate one or more of the angles of rotation (e.g., yaw, pitch and/or roll) of the natural eyelashes, eye area, the face and/or other facial features to infer or estimate correct positioning, location, and/or orientation of an overlay of 3D model (e.g., a 3D model of false eyelashes) with respect to the eye area of a subject. In some embodiments, eye area position estimation can include detecting and tracking the positions of an eye area to infer or determine correct positioning, location, and/or orientation of an overlay of a 3D model of false eyelashes with respect to an eye area of a subject.

In some embodiments, facial position estimation can include detecting and tracking the positions of various facial features (e.g., nose, natural eye lashes, nose bridge, chin, eyes, etc.) to infer pose or position of the face.

For example, and in some embodiments, visual features via one or more sets of points can be identified and tracked across frames of a video segment (e.g., via one or more of natural eyelash position estimation, eye area position estimation, facial position estimation, and/or facial feature estimation). Between frames parameters such as translation, rotation and scaling can be estimated. For instance, the camera's motion can be estimated to determine or estimate the above-mentioned parameters. Using the tracked visual features and estimated camera motion, the processing logic can calculate (e.g., transformation data) the perspective to align the virtual elements (e.g., 3D model(s), such a 3D model of false eyelashes or a 3D model of the eye area) in the video segment that accounts in changes in viewpoint, perspective, and/or movement of visual features. The transformation data can be used to render one or more virtual elements (e.g., 3D models, text and/or graphic overlays) onto the video frames of the video segment. In some embodiments, the visual elements are position and or scaled based on the tracked features and/or camera estimation to integrate the visual elements into the video segment.

In some embodiments, the computer vision operation tracking a set of points corresponding to the eye area of the subject can include an optimization operation. In some embodiments, performing a computer vision operation on all the frames of a video segment to track a set of points corresponding to the eye area of the subject (e.g., activation event) can use a large amount of computer resources (e.g., memory resources or computational resources). In some embodiments, the computer vision operation to track a set of points corresponding to the eye area of the subject can include sampling a subset of frames of the video segment (e.g., sampling the frames below the frame rate, such as 1 out of 3 frames or 1 out of 10 frames) and performing the computer vision operation on the subset of frames to reduce the computer resources used to identify a change in position that satisfies one or more conditions.

In some embodiments, the optimization operation of the computer vision operation can use lower resolution frames (e.g., lower than received from the client device) in detecting the change in position. In some embodiments, the optimization operation of the computer vision operation also includes performing the computer vision operation only on a predetermined object (e.g., the user's eyes, face, eyelashes, and/or eye area) and excluding the remaining content of the video frames from analysis. In some embodiments, one or more the optimization operations, as described herein, can be combined.

At block 306, the processing logic can receive an indication of a user selection of the false eyelashes among a set of false eyelashes. For example, a user can select set of false eyelashes (e.g., artificial lash extensions) associated with specific lash configuration information that can identify one or more a style, length, color, placement, order, etc. In some embodiments, a user can select various artificial lash extensions or sets of artificial lash extensions and preview the artificial lash extensions or sets of artificial lash extensions. The preview can include showing the artificial lash extensions or sets of artificial lash extensions as virtual elements applied to a correct location in video frames of the video segment at the underside of natural eyelashes of the user. In some embodiments, by realistically rendering the artificial lash extensions as an overlay on video frames representing the user (e.g., still image or frames of the video stream/video segment) the artificial lash extensions as applied to the user can be virtually previewed.

In some embodiments, a user can select a GUI element representing a false eyelash (e.g., artificial lash extension) via a GUI or virtual element representing a false eyelash and move (e.g., "drag") the GUI element or virtual element (e.g., via cursor control) to a location proximate (e.g., predetermined location) a visual feature of a streamed video segment (or still image) representing the eye area of the user. In some embodiments, GUI element (e.g., visual element) representing the false eyelash or virtual element representing the false eyelash can "snap" to the predetermined location (e.g., allowing to user to not have to worry about exact placement). Further details with respect to "drag and snap" features are provided in FIG. 4. For example, and in some embodiments, the user can move the virtual element representing an artificial lash extension (e.g., false eyelashes) to some location proximate a location of the eye area represented in the video segment. In some embodiments, the computer vision operation can track the virtual element (e.g., overlay of a 3D model of artificial lash extension) proximate the tracked points corresponding to location of the eye area of the subject. The processing logic can detect a distance of the virtual element from the location of the eye area represented in the video segment. Responsive to determining that the artificial lash extension is a threshold distance from the location (e.g., within 2 centimeters), the processing logic can place (e.g., "snap" the artificial lash extension) the artificial lash extension at the corresponding points of the video segment (e.g., at point(s) at a location at the underside of the visual features representing the underside of the natural eyelashes). In some embodiments, the processing logic can perform one or more of orientation, positioning, or scaling of the virtual element representing the artificial lash extension when the virtual element is being moved and/or when the virtual element is placed at the corresponding points of the video segment.

At block 308, the processing logic generates using the first video segment, a second 3D model of the eye area of the subject. In some embodiments, the 3D model of the eye area of the subject can be modified for successive frames or successive video segments corresponding to changes in position of the eye area and/or human face of the subject. In some embodiments, some or all of the 3D model of the eye area can be overlaid on the video frames of the video segment. The 3D model of the eye area can be overlaid such that facial features represented by the 3D model are accurately overlaid on the corresponding facial features represented in the video segment. In some embodiments, the 3D model is partially or totally transparent. In some embodiments, some or all of the 3D model of the eye area is made visible on the GUI of the client device. In some embodiments, the 3D model of the eye area is used to position (and/or orientate or scale) the first 3D model of false eyelashes (e.g., accurately) or other virtual elements within the first video segment. In some embodiments, the 3D model of the eye area is not used and the first 3D model of the false eyelashes can be positioned within the video segment without using the 3D model of the eye area (e.g., without using the 3D model of the eye area as an overlay). In some embodiments, the 3D model of the false eyelashes or other virtual elements can be positioned using 2D information, such as one or more tracked points (e.g., 2D points) of the video segment.

At block 310, the processing logic determines an orientation of the first 3D model of false eyelashes with respect to the eye area represented in the first video segment.

In some embodiments, orientation can describe the spatial arrangement or positioning of an object (e.g., virtual element) in in space (e.g., 3D space). In some embodiments, orientation can describe how an object is rotated or oriented with respect to the axes of a coordinate system. In some embodiments, orientation can typically be represented using a combination of angles or quaternions to define how the model is rotated or facing. Orientation can describe how the object is positioned relative to a reference point or axis, (e.g., a direction an object is pointing and/or a tilt of the object). In some embodiments, orientation can describe how an object is rotated or oriented with respect to three perpendicular axes, typically represented as the X, Y, and Z axes in a Cartesian coordinate system. In some embodiments, one or more of yaw, pitch and roll can be used to describe orientation. For example, yaw can describe rotation about a vertical axis, such as the Z-axis in a Cartesian coordinate system. Pitch can describe rotation about the lateral axis, such as the Y-axis in a Cartesian coordinate system. Roll can describe the rotation about a longitudinal axis, such as the X-axis in a Cartesian coordinate system.

In some embodiments, the determining the orientation of the 3D model of false eyelashes with respect to the eye area represented in the video segment (or other virtual elements), can include orientating the 3D model of the eye area in a coordinate system and orientating the first 3D model of false eyelashes in the coordinate system and with respect to the second 3D model.

In some embodiments, determining the orientation of the 3D model of false eyelashes with respect to the eye area can be based on 2D information, such as the tracked points of the video segment. In some embodiments, a 3D model of the eye area is not used to orientate the 3D model of false eyelashes. In some embodiments, a 3D model of the eye area is used with 2D information to orientate the 3D model of false eyelashes.

At block 312, the processing logic determines a location of the first 3D model of false eyelashes with respect to the eye area represented in the first video segment.

In some embodiments, location can refer to the position of a 3D model or object in space, such as 2D space or 3D space. For example, a location can described using coordinates, often represented as (x, y, z) values. These coordinates can specify where the object is located within a 3D coordinate space or scene.

In some embodiments, the determining the location of the first 3D model of false eyelashes with respect to the eye area represented in the first video segment, can include identifying a set of landmarks on the second 3D model of the eye area of the subject, the set of landmarks corresponding to the set of points of the first video segment and positioning the first 3D model of false eyelashes with respect to the set of landmarks.

In some embodiments, determining the location of the 3D model of false eyelashes with respect to the eye area can be based on 2D information, such as the tracked points of the video segment. In some embodiments, a 3D model of the eye area is not used to locate the 3D model of false eyelashes. In some embodiments, a 3D model of the eye area is used with 2D information to locate the 3D model of false eyelashes.

At block 314, the processing logic scales the first 3D model of false eyelashes to correspond with the location of the first 3D model of false eyelashes with respect to the eye area represented in the first video segment. In some embodiments, scaling can refer to adjusting a size of an object, such as a virtual element. In some embodiments, virtual elements can be resized to be proportionate to other visual features of the video segment, such as the eyes, natural eyelashes, face, etc. In some embodiments, the scaling can be performed along one or more axes (e.g., X-, Y-, Z-axis).

In some embodiments, the scaling the first 3D model of false eyelashes to correspond with the location of the first 3D model of false eyelashes with respect to the eye area represented in the first video segment, can include scaling dimensions of the first 3D model of false eyelashes to correspond to a location and the orientation within the coordinate system. In some embodiments, the 3D model of false eyelashes is scaled based on the 3D model of the eye area and/or the corresponding 3D coordinate system. In some embodiments, the 3D model of false eyelashes is scaled based on a 2D coordinate system.

At block 316, the processing logic determines mapping data that maps the coordinate system of the first 3D model of false eyelashes and the second 3D model of the eye area to the first video segment. In some embodiments, the overlay of the first 3D model of false eyelashes is positioned in the first video segment based on the mapping data. In some embodiments, the same coordinate system is used for both the 3D model of false eyelashes and the 3D model of the eye area. The determine mapping data can map the 3D model of false eyelashes and the 3D model of the eye area to the coordinate system (e.g., common 3D coordinate system). In some embodiments, the mapping data maps the 3D coordinate system to the 2D coordinate system of the video segment.

In some embodiments, processing logic can determine mapping data that maps the 3D model of false eyelashes to the 2D coordinate system of the video segment without the 3D coordinate system (e.g., using a 2D coordinate system).

At block 318, the processing logic modifies the first video segment to include an overlay of a first 3D model of false eyelashes proximate the tracked points corresponding to the eye area of the subject. In some embodiments, one or more of a scaled 3D model of false eyelashes, orientated 3D model of false eyelashes, or located 3D model of false eyelashes can be used an overlaid virtual element.

In some embodiments, the first 3D model of the false eyelashes can be positioned based on the 2D video frames of the first video segment. In some embodiments, analysis can be performed to identify 2D information pertaining to the 2D frames and the first 3D model of the false eyelashes can be positioned in a video segment based on the 2D information. For instance, the 2D video data can be analyzed to determine facial features corresponding to 2D points (e.g., 2D pixels) and the first 3D model of the false eyelashes can be position in the video segment using the 2D points.

In some embodiments, the first 3D model of false eyelashes can be positioned based on the tracked points of the 2D video frames. In some embodiments, analysis can be performed to identify 2D information pertaining to the 2D frames and the first 3D model of false eyelashes can be positioned in a video segment based on the 2D information. For instance, the 2D video data can be analyzed to determine facial features corresponding to 2D points (e.g., 2D pixels) and the first 3D model of false eyelashes can be position in the video segment using the 2D points.

In some embodiments, the 3D model of false eyelashes can be positioned based on one or more of 2D information or 3D information. In some embodiments, the 3D model of false eyelashes can be positioned based on the mapping data. For example, the 3D coordinate system of the 3D model of the eye area can be mapped to or overlaid on the frames of the video segment. The 3D coordinates corresponding to location of the 3D model of false eyelashes can be mapped to the video segment and overlaid at an accurate position based on the mapping data.

In some embodiments, the first 3D model of false eyelashes can include a first 3D sub-model of a first artificial lash extension and a second 3D sub-model of a second artificial lash extension. Modifying the first video segment to include the overlay of the first 3D model of false eyelashes proximate the tracked points corresponding to the eye area of the subject can include modifying the first video segment to include a first sub-overlay of the first 3D sub-model of the first artificial lash extension proximate a first subset of the set of points and to include a second sub-overlay of the second 3D sub-model of the second artificial lash extension proximate a second subset of the set of points. In some embodiments, the first sub-overlay and the second sub-overlay are positioned proximate the tracked points corresponding to an area of the first video segment representing an underside of natural eyelashes of an eye of the subject. In other embodiments, the first and second 3D sub-model of the set of artificial lash extensions can be positioned in any manner as described herein.

In some embodiments, the processing logic can perform a second computer vision operation on a second video segment (or any video segment, such as the first video segment) of the video stream to track a point corresponding to a user placement of the 3D model of false eyelashes (e.g., or real false eyelashes). It can be noted that is some embodiments, this and other below embodiments can be implemented after block 306. For example, a user can select and move (e.g., drag) a representation of the false eyelashes to a position (e.g., "snap point") to preview the false eyelashes arranged on the representation of the subject in a video segment or still image. The processing logic can determine whether a position of the tracked point corresponding to the user placement of 3D model of false eyelashes satisfies a condition indicative of a threshold proximity to one or more of the tracked points corresponding to the eye area. For example, the computer vision operation for determining whether the position of the tracked point corresponding to the user placement of 3D model of false eyelashes satisfies a condition indicative of a threshold proximity to one or more of the tracked points corresponding to the eye area, can include use of computer vision algorithms that identify and track the position and orientation of the tracked point in each frame (and/or the position of the 3D model of false eyelashes with respect to the tracked points). In some embodiments, responsive to determining that the condition is satisfied, the processing logic can position (e.g., "snap") the corresponding tracked point(s). In some embodiments, the user does not need to move the 3D model of the false eyelashes above or on the tracked points, but can be some threshold distance from the tracked points, to satisfy the condition.

In some embodiments, the processing logic can detect specific features or markers of the tracked point that are unique and recognizable through pattern recognition techniques. In some embodiments, the processing logic can compare the detected position and orientation of the tracked point against predefined criteria for correct positioning of the overlay of the first 3D model of false eyelashes, which could include specific coordinates, alignment with other objects, or orientation within the environment (e.g., with respect to a 3D model of an eye area and/or 2D information). In some embodiments, if a current position and orientation of the 3D model of false eyelashes match the predefined criteria within acceptable thresholds, the processing logic can determine that the 3D model of false eyelashes has been correctly positioned.

In some embodiments, the processing logic can, responsive to determining that the position of the tracked point corresponding to the user placement of the first 3D model of false eyelashes satisfies the condition, modify the second video segment to position the overlay of the first 3D model of false eyelashes with respect to the one or more of the tracked points. For example, if the user selects (e.g., taps) and moves (e.g., drags) the representation of the false eyelashes to within a predefined proximity of the tracked points the false eyelashes can be previewed via modification of the second video segment to position the overlay of the first 3D model of false eyelashes with respect to the tracked points.

At block 320, the processing logic provides the first modified video segment for presentation at the client device (e.g., in real-time).

Figure 4A:
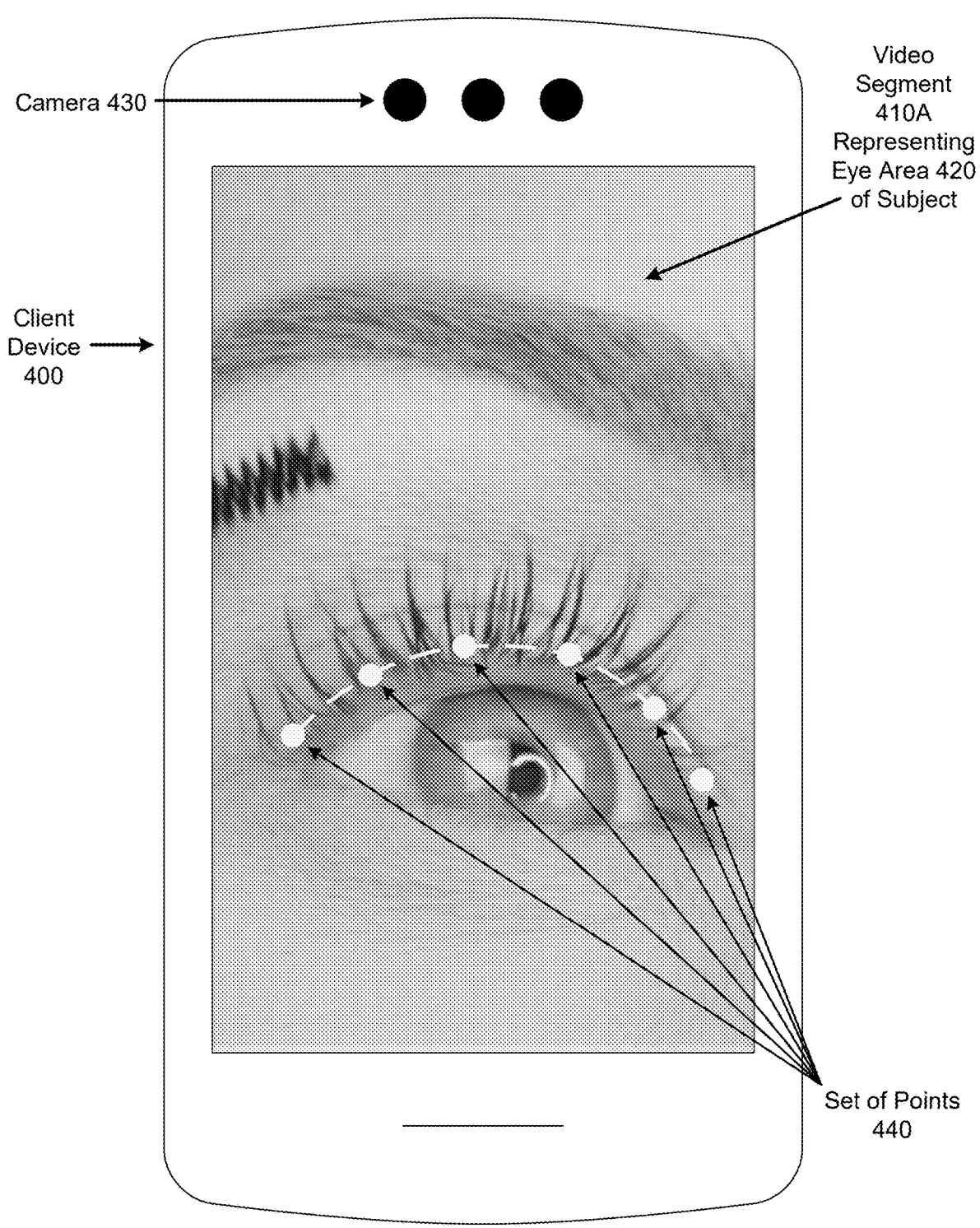
FIGS. 4A-C illustrate modified frames of video segments including, according to some embodiments.

FIG. 4A depicts a modified frame of a video segment including a set of tracked points corresponding to an eye area 420 of a subject presented on a client device 400, according to some embodiments.

In some embodiments, a processing logic can receive a first video segment of a video stream from client device 400. The video segment 410A can represent an eye area 420 of a subject. Client device 400 can include a camera 430 for capturing video streams. For example, camera 430 can capture video streams of a human face of a user (e.g., the subject). A video stream captured by camera 430 can include one or more video segments, such as the first video segment 410A on which a first computer vision operation can be performed to track a set of points 440 corresponding to the eye area 420 of the subject.

Figure 4B:
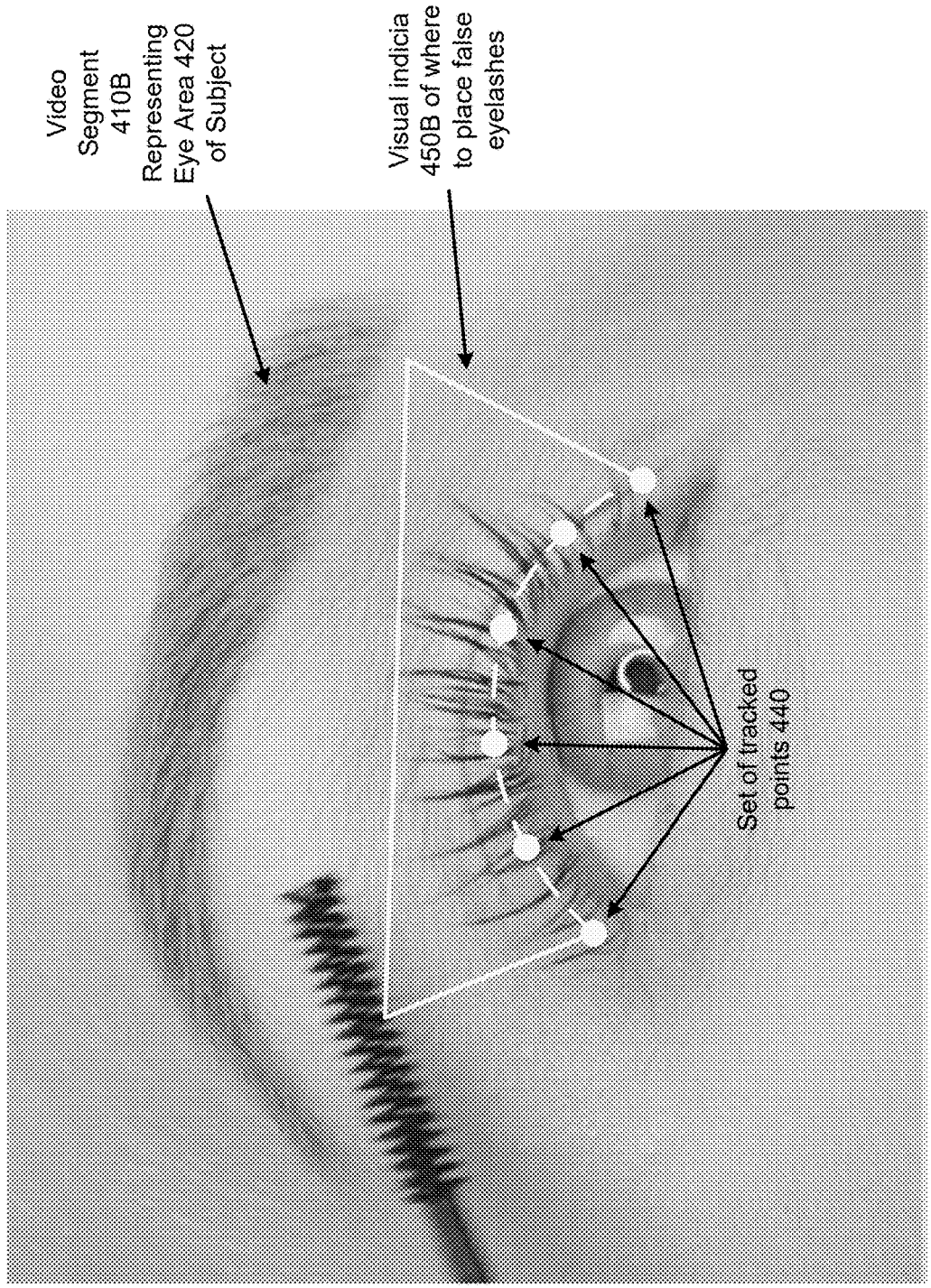

FIG. 4B depicts a modified frame of a video segment including a set of tracked points corresponding to an eye area 420 of a subject, according to some embodiments.

In some embodiments, the processing logic can modify the first video segment 410B to include visual indicia 450B (e.g., virtual element(s)) of where to place an overlay of a first 3D model of false eyelashes (e.g., virtual element representing false eyelashes) proximate the tracked points 440 corresponding to the eye area 420 of the subject. In some embodiments, the tracked points 440 can include visual indica (e.g., virtual elements) that are presented in the modified video segment 410B. In some embodiments, the tracked points 440 are not presented as visual indica (e.g., virtual elements) in the modified video segment 410B. For example, tracked points 440 can be tracked and not displayed on client device 400.

Figure 4C:
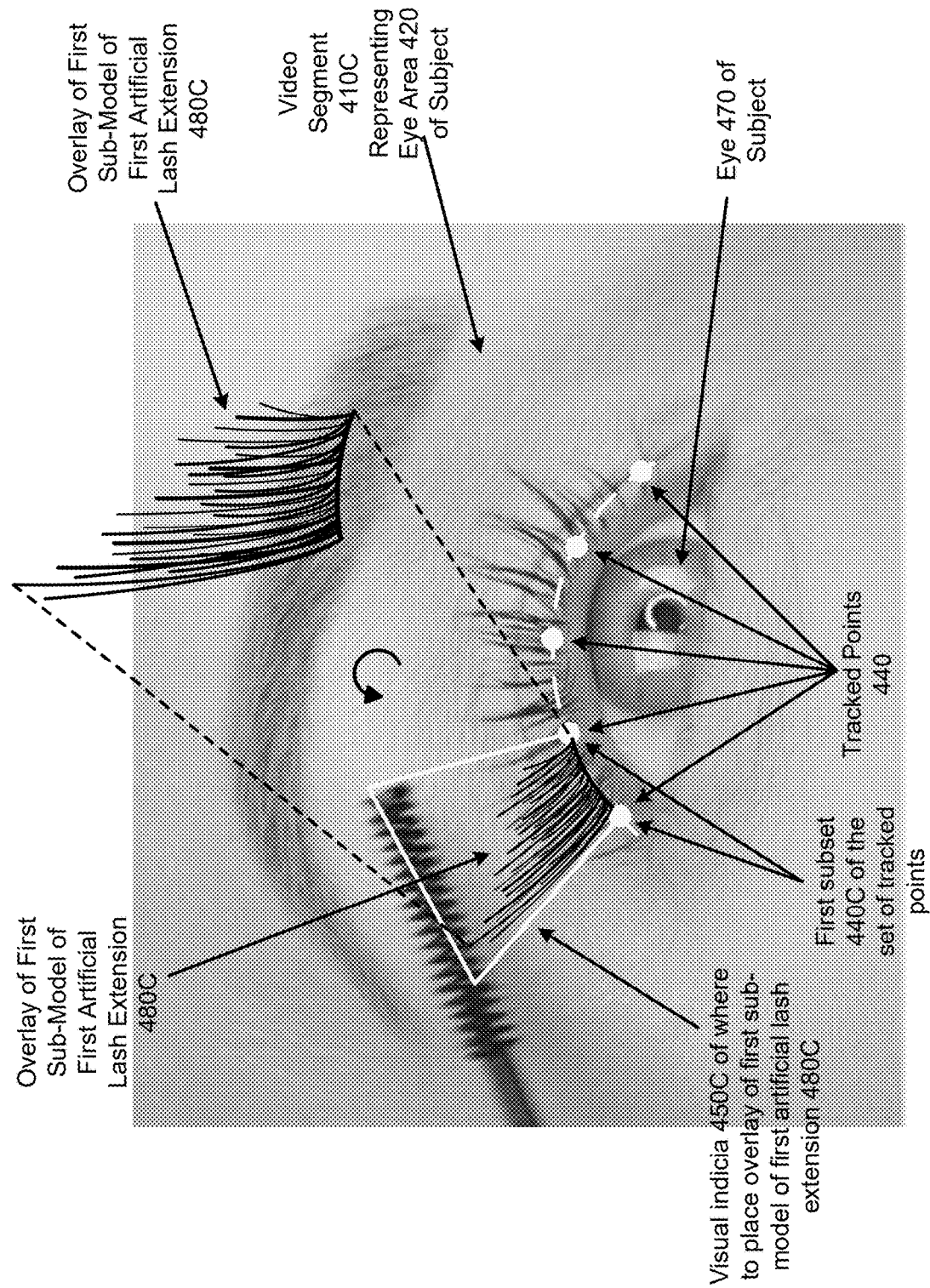

In some embodiments, the subject (e.g., user) can then move (e.g., drag) and position (e.g., drop) a representation of the false eyelashes (e.g., virtual element representing a false eyelash, such as an artificial lash extension) via a GUI for preview as described in FIG. 4C. In some embodiments, user inputs can allow users to select a set of artificial lash extensions (e.g., with a single tap or click) from a selection of sets of artificial lash extensions via the GUI. In some embodiments, in response to receiving the user input the system can automatically position the selected set of artificial lash extensions at a predetermined location (e.g., corresponding to tracked points 440). For example, responsive to selecting set of artificial lash extensions, one or more of the set of artificial lash extensions can be automatically positioned in video frames to generate a modified video segment showing the one or more 3D models of artificial lash extensions applied to the subject represented in the video segment.

FIG. 4C depicts a modified frame of a video segment including an overlay of a 3D model of false eyelashes proximate tracked points corresponding to an eye area of a subject, according to some embodiments.

In some embodiments, the processing logic can modify the video segment 410C to include an overlay of a first 3D model of false eyelashes (e.g., a virtual element representing a false eyelash) proximate the tracked points 440 corresponding to the eye area 420 of the subject. The processing logic can provide the first modified video segment 410C for presentation at the client device 400 (e.g., in real-time).

In some embodiments, the processing logic can modify the first video segment 410C to include visual indicia 450C (e.g., visual element) indicated a location to place (e.g., drag and snap) a first 3D model of false eyelashes, where the location is proximate the tracked points 440 (or a first subset of tracked points 440C) corresponding to the eye area 420 of the subject. In some embodiments, "drag and drop" can include a user interaction operation where a user selects an object (e.g., GUI element or virtual element) by, for example, selecting the object with a cursor or touch operation, maintaining the selection (e.g., continuing to hold the cursor button or touch), moving the object (e.g., via cursor or touch) to a new location with respect to the GUI, and then releasing the object to place the object in the new location (e.g., drop by releasing the cursor or touch). On a mobile device, drag and drop can involve touching the screen to "pick up" an item, dragging the object across the touchscreen, and lifting the finger to "drop" the object in a new location. Similar operations can be performed with a computer mouse by clicking and holding the mouse button, moving the mouse, and then releasing the button. It can be noted the user input described with respect to drag and drop can be received by processing logic as commands, which can be executed accordingly. This method allows for easy moving or repositioning of objects within a digital environment. In some embodiments, in response to an object being dropped the object can snap to a predetermined location with respect to the image or video displayed in the client device. For example, an overlay of a first sub-model of first artificial lash extension 480C can snap to a first subset 440C of the set of tracked points 440 corresponding to an eye area 420 of the subject.

In some embodiments, tracked points 440 can be displayed in a modified video segment 410C and can indicate where to position the artificial lash extension 480C (e.g., virtual element). In some embodiments, where the positioning of a 3D model of a set of artificial lash extensions is automatic and occurs in response to selection of the set of artificial lash extensions, the user input can include the selection of the set of artificial lash extensions. In some embodiments, where the user drags and drops an overlay of a 3D model of an artificial lash extensions or a set of artificial lash extensions, in response to the 3D model of the set of artificial lash extensions being within a particular range of at least one of tracked points 440, the processing logic can automatically position the set of artificial lash extension at the appropriate location. For example, a user can drag and drop an overlay of a 3D model of the first sub-model of first artificial lash extension 480C within a range of the first subset 440C of the set of tracked points 440, in response to which the virtual element representing lash extension 480C will "snap" between or attach to the first subset 440C of the set of tracked points 440 (e.g., without touching the 3D model of the 3D model of the first sub-model of first artificial lash extension 480C virtually contacting the first subset 440C of the set of tracked points 440).

In some embodiments, the first 3D model of false eyelashes is a three-dimensional digital representation of the false eyelashes. In some embodiments, the 3D model of the false eyelashes can be modified for successive frames or successive video segments corresponding to changes in position of the human face of the subject causing the 3D model of the false eyelashes to change position. In some embodiments, the processing logic can identify landmarks corresponding to the tracked points. In some embodiments, a 3D model of an eye area of the human face is used to position the first 3D model of false eyelashes (e.g., accurately) within the first video segment. In some embodiments, the processing logic can fit an existing model to the eye area of the subject. The processing logic can generate a coordinate system that corresponds to the location of the respective features of the eye area of the subject in the 2D frame. The processing logic can orientate and position the overlay of first sub-model of first artificial lash extension 480C in the coordinate system and with respect to the second 3D model of the eye area. In some embodiments, the processing logic can generate 3D model of the eye area of the subject using video segment 410C. The 3D model of the eye area of the subject can be modified for successive frames or successive video segments corresponding to changes in position of the eye area and/or human face of the subject. In some embodiments, the 3D model of the eye area is used to position and orientate the first sub-model of first artificial lash extension 480C (e.g., a 3D model of false eyelashes) within the first video segment 410C.

In some embodiments, the first 3D model of the false eyelashes can be positioned based on the 2D video frames of the first video segment. In some embodiments, analysis can be performed to identify 2D information pertaining to the 2D frames and the first 3D model of the false eyelashes can be positioned in a video segment based on the 2D information. For instance, the 2D video data can be analyzed to determine facial features corresponding to 2D points (e.g., 2D pixels) and the first 3D model of the false eyelashes can be position in the video segment using the 2D points.

In some embodiments, the first 3D model of false eyelashes can include a first 3D sub-model of a first artificial lash extension 460C and a second 3D sub-model of a second artificial lash extension (not shown). In some embodiments, modifying the first video segment 410C to include the overlay of the first 3D model of false eyelashes proximate tracked points 440 corresponding to the eye area 420 of the subject can include modifying the first video segment 410C to include a first sub-overlay of the first 3D sub-model of the first artificial lash extension 460C proximate a first subset of the set of points 440C and to include a second sub-overlay of the second 3D sub-model of the second artificial lash extension (not shown) proximate a second subset of the set of points. In some embodiments, the first sub-overlay 480C and the second sub-overlay can be positioned proximate the tracked points 440 corresponding to an area of the first video segment 410 representing an underside of natural eyelashes of an eye 470 of the subject.

In some embodiments, a user can "drag and drop" one or more of a set of sub-overlays of the 3D sub-models of a set of artificial lash extensions that correspond to a lash configuration. In some embodiments, the user can "drag and drop" one or more of the set of sub-overlays of the 3D sub-models of the set of artificial lash extensions one by one. In some embodiments, the user can "drag and drop" the set of sub-overlays of the 3D sub-models of the set of artificial lash extensions simultaneously.

For example, a user can tap and drag a representation of the false eyelashes to a "snap point" to preview the false eyelashes. In some embodiments, "snap point" can refer to a predefined location in a digital interface where a virtual element, once dragged and dropped by a user, automatically aligns and locks into position. Allowing for precise placement of items within a GUI. When a user drags a virtual element towards a "snap point", the processing logic can detect its proximity and "snap" the item into the position. The processing logic can determine whether a position of the tracked point corresponding to the user placement of the first 3D model of false eyelashes satisfies a condition indicative of a threshold proximity to one or more of the tracked points corresponding to the eye area. For example, the processing logic can, responsive to determining that the position of the tracked point corresponding to the user placement of a virtual element representing false eyelashes satisfies a condition, modify a video segment to position the set of sub-overlays of the 3D sub-models of the set of artificial lash extensions with respect to the tracked points 440. If the user taps and drags a set of sub-overlays of 3D sub-models of a set of artificial lash extensions to within a predefined proximity of the tracked points 440 the false eyelashes can be previewed via modification of the video segment 410C, for example, the processing logic can position the set of sub-overlays of the 3D sub-models of the set of artificial lash extensions with respect to the tracked points.

In some embodiments, the user can move the virtual element representing an false eyelashes (e.g., overlay of first sub-model of first artificial lash extension 480C) to some location proximate a location of the eye area 420 represented in the video segment 410C. In some embodiments, the computer vision operation can track the virtual element proximate the tracked points 440 and/or the first subset 440C of the set of tracked points corresponding to the location of the eye area 420 of the subject. The processing logic can detect a distance of the virtual element from the location of the eye area 420 represented in the video segment 410C. Responsive to determining that the virtual element is a threshold distance from the location (e.g., within 2 centimeters), the processing logic can place (e.g., "snap" the artificial lash extension) the artificial lash extension at the corresponding points of the video segment 410C (e.g., at point(s) at a location at the underside of the visual features representing the underside of the natural eyelashes). In some embodiments, the processing logic can perform one or more of orientation, positioning, or scaling of the virtual element representing the artificial lash extension when the virtual element is being moved and/or when the virtual element is placed at the corresponding points of the video segment.

In some embodiments, user inputs can allow users to select a set of artificial lash extensions (e.g., with a single tap or click). In some embodiments, in response to receiving the user input the processing logic can automatically position a set of sub-overlays of the 3D sub-models of the set of artificial lash extensions (e.g., a virtual representation of false eyelashes) at a predetermined location (e.g., corresponding to tracked points 440).

In some embodiments, the processing logic can perform a second computer vision operation on a second video segment (or any video segment) of the video stream to track a point (or multiple points) corresponding to a user placement of a 3D model of false eyelashes. The processing logic can determine whether a position of the tracked point(s) corresponding to the user placement of the 3D model of false eyelashes satisfies a condition indicative of a threshold proximity to one or more of the tracked points corresponding to the eye area. The processing logic can, responsive to determining that the position of the tracked point corresponding to the user placement of 3D model of false eyelashes satisfies the condition, modifying the second video segment to position the overlay of the first 3D model of false eyelashes with respect to the one or more of the tracked points. In some embodiments, in response to the tracked point corresponding to the user placement of 3D model of false eyelashes gets close to one of the tracked points 440 at the underside of the lashes, the position the overlay of the first 3D model of false eyelashes can "snap" to the tracked point. In some embodiments, the processing logic can determine one or more of an orientation, a location, and/or a scaling of the first 3D model of false eyelashes with respect to the eye area represented in the video segment. For example, overlay of first sub-model of first artificial lash extension 460C can be rotated (e.g., orientated), shrunken to scale (e.g., scaled), and placed (e.g., located based on the orientation, scale, and location of a second 3D model of the eye area 420.

The processing logic can generate, using the first video segment, the second 3D model of the eye area 420 of the subject. In some embodiments, the processing logic generates, using the first video segment, a 3D model of an eye area of a human face of the subject. In some embodiments, the 3D model of an eye area can be part of a 3D model of the human face generated using the first video segment. In some embodiments, the 3D model of an eye area can be modified for successive frames or successive video segments corresponding to changes in position of the face human face of the subject. In some embodiments, the processing logic can identify landmarks of the 3D model of the eye area corresponding to the tracked points. In some embodiments, a some or all of the 3D model of an eye area can be overlaid on the video frames of the video segment. In some embodiments, the 3D model is partially or totally transparent. In some embodiments, some or all of the 3D model of an eye area is made visible on the GUI of the client device. In some embodiments, the 3D model of an eye area is used to position the first 3D model of false eyelashes (e.g., accurately) within the first video segment. In some embodiments, the 3D model of an eye area is not used and the first 3D model of the false eyelashes can be positioned within the video segment without using the 3D model of an eye area (e.g., without using the 3D model of an eye area as an overlay).

In some embodiments, the first 3D model of the false eyelashes can be positioned based on the 2D video frames of the first video segment. In some embodiments, analysis can be performed to identify 2D information pertaining to the 2D frames and the first 3D model of the false eyelashes can be positioned in a video segment based on the 2D information. For instance, the 2D video data can be analyzed to determine facial features corresponding to 2D points (e.g., 2D pixels) and the first 3D model of the false eyelashes can be position in the video segment using the 2D points.

In some embodiments, as mentioned above, a 3D model can be used as an overlay (e.g., for enhancing 2D video frames with visual indicia). In some embodiments, a 3D model includes landmarks, such as a nose bridge, tip of nose, inner corner of eye etc. In some embodiments, the 3D model can be rendered as a transparent or semi-transparent overlay allowing for integration of the 3D model with 2D images (e.g., 2D video frames). In some embodiments, a generic 3D model can be modified to match the unique characteristics of an individual's eye area (e.g., accurately reflecting the facial features such as the eye area of the subject).

In some embodiments, the processing logic can orientate the second 3D model of the eye area 420 in a coordinate system and orientate the first 3D model of false eyelashes (e.g., artificial lash extensions 460C) in the coordinate system and with respect to the second 3D model.

In some embodiments, the processing logic can identify a set of landmarks on the second 3D model of the eye area 420 of the subject. The set of landmarks can correspond to the set of tracked points 440 of the first video segment 410C. The processing logic can position the first 3D model of false eyelashes (e.g., artificial lash extensions 460C) with respect to the set of landmarks.

In some embodiments, 3D landmark data can include data that represents one or more 3D landmarks corresponding to one or more facial features of a human face (e.g., represented by 2D facial feature data). In some embodiments, 3D landmark data can correspond to associated 2D facial feature data (e.g., represent the same facial feature). In some embodiments, 3D landmark data can identify one or more 3D points (e.g., vertices of the 3D model data) that represent a respective facial feature represented by 2D facial feature data. For example, the nose of a subject can be represented by a single 3D point (and corresponding 2D point of the 2D facial feature data) at the tip of the nose, or by multiple 3D points (and corresponding 2D points of the 2D facial feature data) along the bridge of the nose, the tip of the nose, and/or outline of the nose.

In some embodiments, the 3D landmark data can include 3D coordinate data that represents the 3D points, such as x-coordinate, y-coordinate, and z-coordinate information identifying the one or more 3D points (e.g., vertices) in three-dimensional space. In some embodiments, the 3D landmark data can include textual identifiers of respective facial features represented by one or more 3D points. For example, a 3D landmark that represents a nose can include or be associated with a textual identifier, "nose." In some embodiments, the 3D landmarks identified by the 3D landmark data that correspond to facial features represented by the 2D facial feature data can be referred to as "target 3D landmarks" or "3D landmarks" herein.

In some embodiments, the 3D landmark data can correspond to a respective 3D model represented by a 3D model data. For example, each 3D model can include a respective instance of 3D landmark data.

In some embodiments, the processing logic can scale dimensions of the first 3D model of false eyelashes (e.g., artificial lash extensions 460C) to correspond to a location and the orientation within the coordinate system.

In some embodiments, the processing logic can determine mapping data that maps the coordinate system of the first 3D model of false eyelashes (e.g., artificial lash extensions 460C) and the second 3D model of the eye area 420 to the first video segment 410C. In some embodiments, the overlay of the first 3D model of false eyelashes (e.g., artificial lash extensions 460C) can be positioned in the first video segment 410C based on the mapping data.

Figure 5:
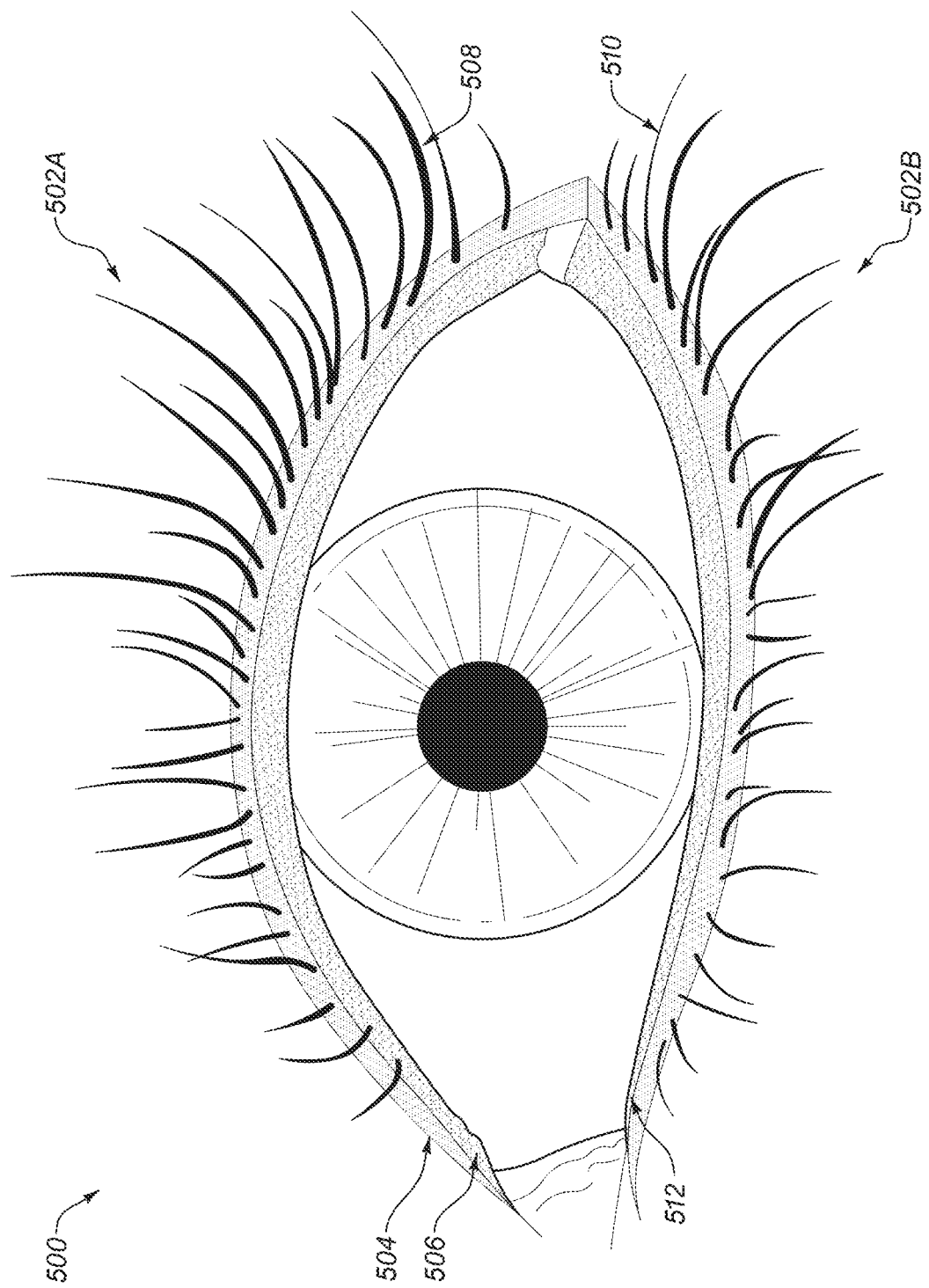
FIG. 5 is an illustration of an eye area, in accordance with some embodiments of the disclosure.

FIG. 5 is an illustration of an eye area, in accordance with some embodiments of the disclosure. As shown in FIG. 5, the eye area 500, such as a human eye area, can include natural eyelashes 502A (also referred to as "upper natural eyelashes" herein) and natural eyelashes 502B (also referred to as "lower natural eyelashes 502B" herein). Natural eyelashes 502A and 502B can have an underside and top side opposite the underside. For example, natural eyelashes 502A illustrate an underside 508. Natural eyelashes 502B illustrate a top side 510. Natural eyelashes 502A and 502B are collectively referred to as natural eyelashes 502, herein. It may be noted that natural eyelashes can also be referred to as "natural lashes" herein.

The eye area 500 includes an upper lash line 504 (also referred to as "lash line 504" herein) and upper waterline 506 (also referred to as "waterline 506" herein). In some embodiments, a lash line, such as the upper lash line 504 or lower lash line of natural eyelashes 502B, can include the area between the natural eyelashes. The lash line can be curved and follow the alignment of the natural eyelashes 502. In some embodiments, the upper lash line 504 can include some area of the skin that is above (e.g., directly above) the natural eyelashes 502A and/or below (e.g., directly below) the natural eyelashes 502A. Similarly, the lower lash line can include some area of the skin that is below (e.g., directly below) the natural eyelashes 502B and/or above (e.g., directly above) the natural eyelashes 502B.

In some embodiments, the waterline (also referred to as "wetline"), such as upper waterline 506 corresponding to natural eyelashes 502A and lower waterline 512 corresponding to natural eyelashes 502B, can include an area (or line) of skin that is exposed between the natural eyelashes 502A and the eye.

Spatially relative terms, such as "under," "upper" "lower," "top," "bottom," and so forth as used herein refer to a relative position of one element with respect to another element. Unless otherwise specified, the spatially relative terms are not intended to be limiting to the absolute orientation, and are intended to encompass different orientations (e.g., rotated 90 degrees, inverted, flipped) of elements in addition to the orientation depicted in the Figures. For example, if elements in the Figures are inverted, elements described as "upper" elements can then be considered oriented as "lower" elements, without deviating from aspects of the disclosure.

Figure 6:
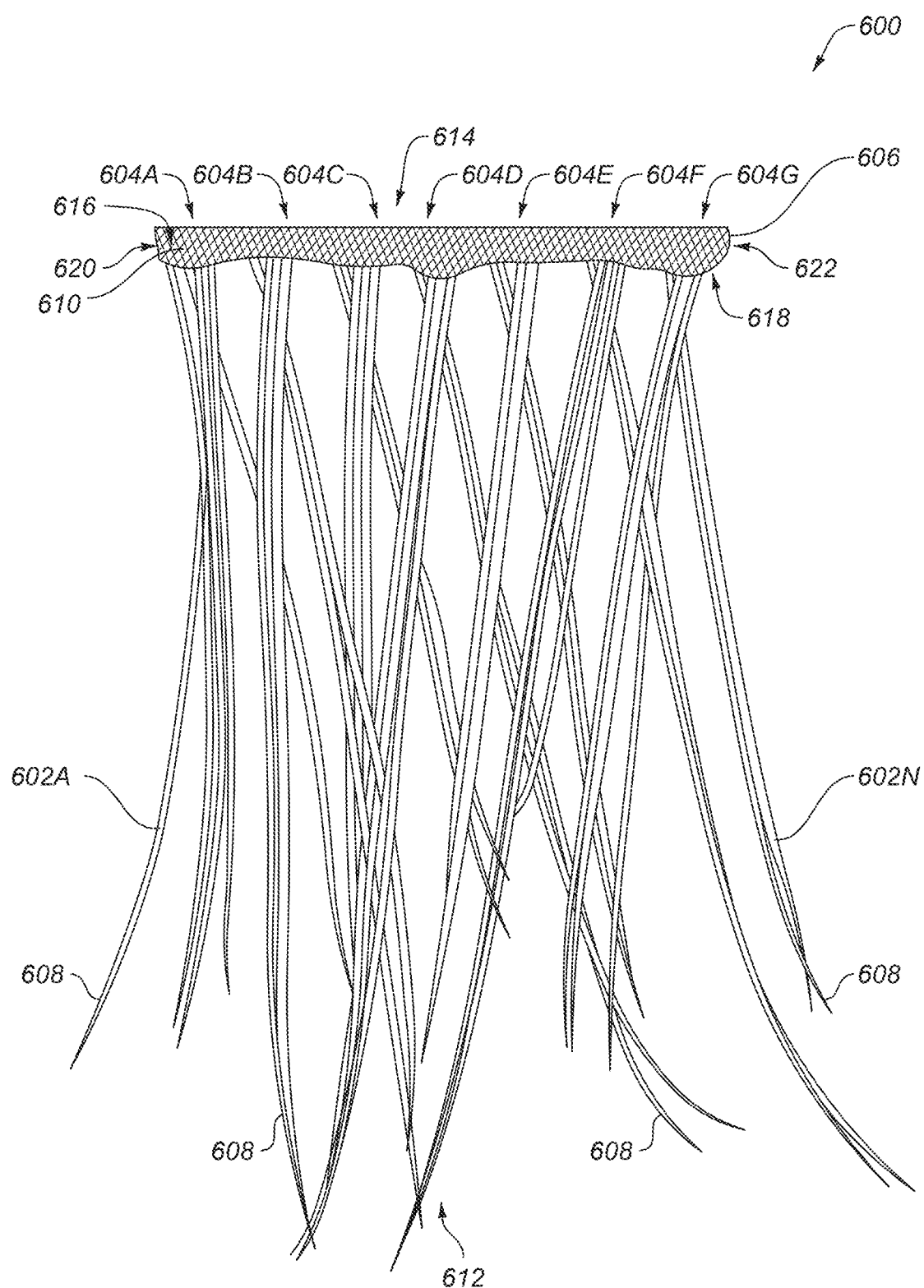
FIG. 6 is an illustration of an exemplary artificial lash extension with a textured base, in accordance with some embodiments of the disclosure.
Figure 7:
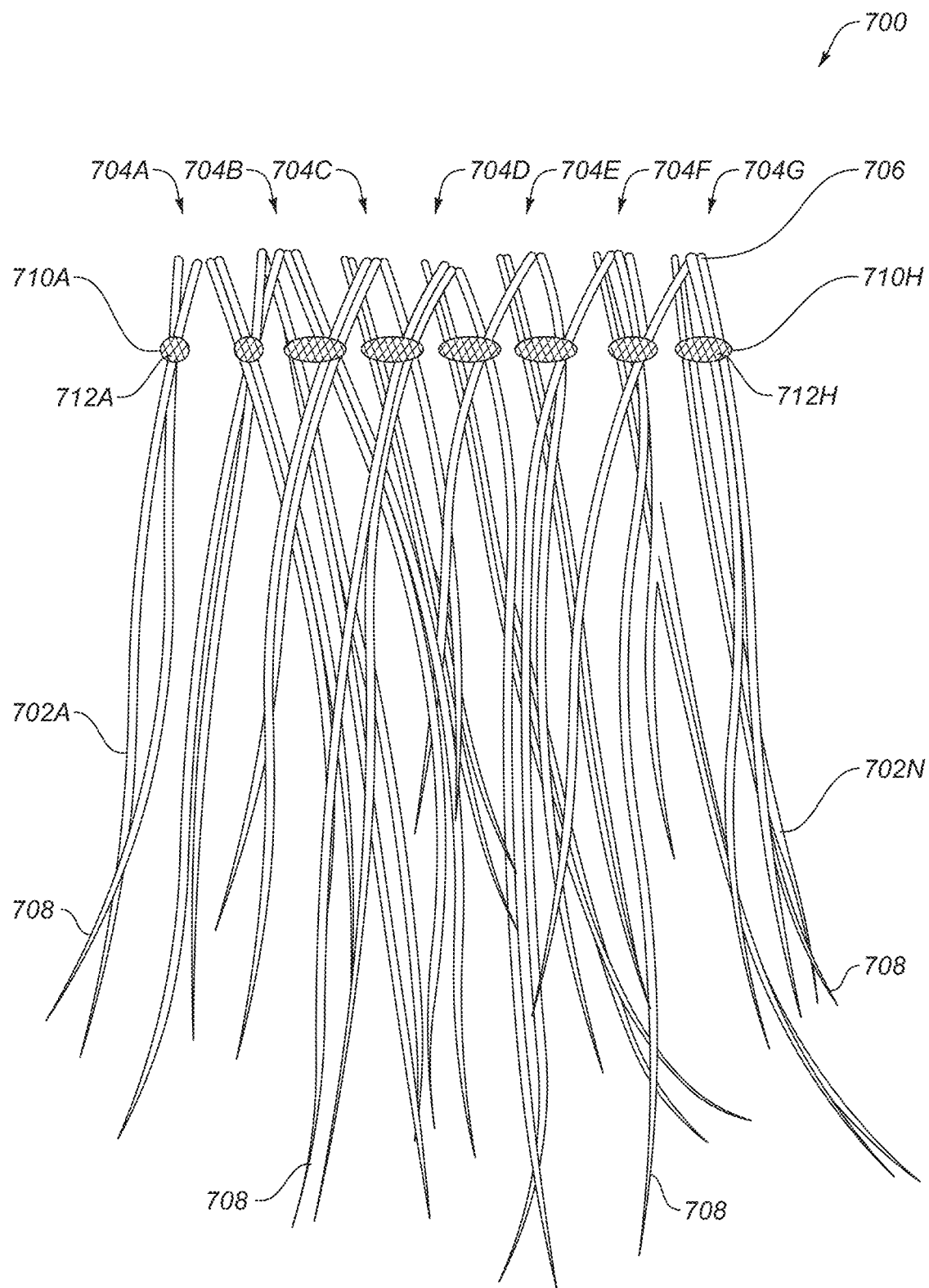
FIG. 7 is an illustration of another exemplary artificial lash extension with a textured base, in accordance with some embodiments of the disclosure.

FIG. 6 is an illustration of an exemplary artificial lash extension with a textured base, in accordance with some embodiments of the disclosure. FIG. 7 is an illustration of another exemplary artificial lash extension with a textured base, in accordance with some embodiments of the disclosure.

In some embodiments, one or more of artificial lash extension 600 or artificial lash extension 700 (both also referred to as "lash extension," "artificial eyelash extension," "lash segment" or "artificial lash segment" herein) are designed or configured for application at the underside of the natural eyelashes of the user, or alternatively, even the top side of the natural eyelashes of a user. In some embodiments, one or more of artificial lash extension 600 or artificial lash extension 700 can be part of a set of multiple artificial lash extensions. In some embodiments, one or more of artificial lash extension 600 or artificial lash extension 600 can be a segment of a "full" artificial lash extension such that when multiple artificial lash extensions are arranged adjacent to one another at the underside of natural eyelashes (e.g., natural eyelashes 502A) the arranged artificial lash extensions span the length of the natural eyelashes to form a full artificial lash extension. In some embodiments, the artificial lash extensions (e.g., segments) can be shorter than the horizontal length of the natural eyelashes (e.g., length of the lash line). In some embodiments, 3-5 artificial lash extensions can be arranged adjacent to one another at the underside of the natural eyelashes so that the set of arranged artificial lash extensions span the length of the natural eyelashes. In other embodiments, an artificial lash extension can be longer such that the artificial lash extension is a "full" artificial lash extension that substantially spans the horizontal length of the natural eyelashes. The artificial lash extension can be arranged to substantially align with the lash line of the user. In some embodiments, using artificial lash extensions that are independent segments can allow an individual artificial lash extension to move independently when bonded to the underside of a natural lash, which mimics the movement of the natural lash and can improve the feel, comfort, and longevity of the artificial lash extensions.

Artificial lash extension 600 and artificial lash extension 700 respectively depict artificial hairs 602A-602N (collectively referred to as "artificial hairs 602" herein) and 702A-702N (collectively referred to as "artificial hairs 703" herein). In some embodiments, the artificial hairs of an artificial lash extension, such as artificial lash extension 600 or artificial lash extension 700, can be formed from one or more synthetic materials, including but not limited to polybutylene terephthalate (PBT), acrylic resin, polyester (e.g., polyethylene terephthalate (PET)), other polymers, other synthetic material, or a combination thereof. In alternative embodiments, a natural material such as natural hair (e.g., human hair or mink hair) can be used. In some embodiments, the artificial hairs of a particular artificial lash extension can have one or more lengths and/or one or more diameters. In some embodiments, the diameter of an artificial hair can be between approximately 0.0075 millimeters (mm) (e.g., 0.0075 mm+/−0.0025 mm) to 0.3 mm (e.g., 0.3 mm+/−0.05 mm). In some embodiments, the ends of one or more of the artificial hairs can be tapered. In some embodiments, the one or more of artificial hairs can be curled or shaped in a particular direction. For example, the ends 608 of artificial hairs 602 or the ends 708 of artificial hairs 702 can be tapered or curled or both. In another example, the ends 608 of artificial hairs 602 can be curled upwards in the direction of the top side of the artificial lash extension 600. In some embodiments, the artificial hairs can range from 3 mm to 30 mm in length, or in some instances even longer.

In some embodiments, artificial lash extension 600 of FIG. 6 and artificial lash extension 700 FIG. 7 can include multiple sides, such a front side, a rear side, a top side, a bottom side, a first end, and a second end opposite the first end. The sides are described relative to an orientation of an artificial lash extension when attached to a user's natural eyelashes, for the sake of illustration, rather than limitation. Referring to artificial lash extension 600 of FIG. 6, the front side 612 can refer to a side that is a forward part of the artificial lash extension. For example, the front side 612 of artificial lash extension 600 faces opposite the user when attached to a user's natural eyelashes. The back side 614 can refer to a side that is opposite the front side 612 and faces the user's face when attached to a user's natural eyelashes. The top side 616 can refer to an uppermost part and faces towards the top of the user's head when attached to a user's natural eyelashes. The bottom side 618 is opposite the top side 616 and faces towards the user's feet when attached to a user's natural eyelashes. The first end 620 and the second end 622 can refer to lateral parts or lateral sides of an artificial lash extension. For example, the first end 620 can be a left side and the second end 622 can be a right side (or vice versa) when the artificial lash extension is attached to the user's natural eyelashes. Although multiple sides are described with respect to artificial lash extension 600, artificial false eyelashes and other artificial lash extensions, such as artificial lash extension 700 can be described having similar sides. Additionally, the sides as described with respect to an artificial lash extension 600 can also be used to describe sides of a base of an artificial lash extension, as further described below.

In some embodiments, an artificial lash extension can include a base. For example, artificial lash extension 600 includes base 606. In some embodiments, artificial lash extension 700 may or may not (as illustrated) include a base similar to base 606 of artificial lash extension 600. The base can include a top side (e.g., facing out of the page and towards the reader), a bottom side, a back side, a front side, and two ends (e.g., two lateral sides). In some embodiments, one or more of the multiple artificial hairs of artificial lash extension protrude out the front side of the base. When arranged at the underside of a natural lash, the backside of the artificial lash extension can point towards the user's eye. The thickness (e.g., between the top side and bottom side of the base can be between approximately 0.05 millimeters (mm) and approximately 0.15 mm (e.g., 0.05 mm+/−0.01 mm). In some embodiments, the thickness of the base can be less than 0.05 mm. In some embodiments, the low profile of the base is designed to allow the artificial lash extension to be light weight to better adhere to the underside of the natural lash and prevent obstruction of a user's view. The low profile of the base can at least in part be attributed to an attachment operation that forms the base and/or attaches clusters of artificial hairs to the base. For example, the attachment operation can include an application of heat that, at least in part, creates a base with a low profile.

In some embodiments, one or more of the top side or bottom side (e.g., surface) of the base is substantially flat (e.g., having a flatness control tolerance value of +/−0.03 mm or +/−0.015 mm). In some embodiments, the flatness of the base of the artificial lash extension 600 is designed to allow improved contact and adhesion to a surface, such as the underside of a natural eyelash or the opposing surface of another artificial lash extension. The flatness of the base can at least in part be attributed to the attachment operation.

In some embodiments, one or more of artificial lash extension 600 of FIG. 6 and artificial lash extension 700 FIG. 7 include artificial hairs 602 and 702 that are respectively configured into clusters of artificial hairs 604A-604G (collectively referred to as "clusters 604" or "clusters of artificial hairs 604" herein) and clusters of artificial hairs 704A-704G (collectively referred to as "clusters 704" or "clusters of artificial hairs 704" herein). In some embodiments, a cluster of artificial hairs can refer to two or more artificial hairs that are grouped together. In some embodiments, one or more artificial hairs of a cluster of artificial hairs contact one another at or near the base. In some embodiments, two or more artificial hairs of a cluster can contact one another before and/or after an attachment operation, such as an application of heat. In some embodiments, 6-30 artificial hairs can be included in a cluster.

In some embodiments, the clusters of artificial hairs can be connected to or at the base with an application of heat in a similar manner as described herein (e.g., attachment operation). In some embodiments, the application of heat can at least partially melt at least some of the artificial hairs of one or more clusters of the artificial lash extension. In some embodiments, the application of heat can at least partially melt at least some of the artificial hairs of at least one cluster so that at least some of the artificial hairs of the cluster connect to one another. In some embodiments, the application of heat can at least partially melt at least some of the artificial hairs of at least one cluster so that at least some of the artificial hairs of the cluster connect to the base of the artificial lash extension (and/or form, at least in part, the base of the artificial lash extension). In some embodiments, at least some of the artificial hairs of at least one clusters are connected to one another at a respective part of the base by at least the application of heat.

In some embodiments, the clusters are connected to one another at the base by the application of heat. In some embodiments, one or more of the clusters of the artificial lash extension are directly connected to at least one adjacent cluster at the base. In some embodiments, one or more of the clusters of the artificial lash extension are indirectly connected to at least one adjacent cluster of the artificial lash extension at the base.

In some embodiments, at least two artificial hairs of an artificial lash extension crisscross each other. For example, two artificial hairs of a particular cluster can crisscross one another. In some embodiments, one or more individual clusters of artificial hairs can be formed using an application of heat as described above. Thus, the clusters can have a base (e.g., cluster base). The clusters can be arranged, and heat can be applied, as described above, to the cluster bases to form at least in part the base (e.g., base 606) of the artificial lash extension. In some embodiments, artificial lash extensions 600 or 700 may be 4-10 mm wide. In some embodiments, artificial lash extension 600 or 700 may be 5-6 mm wide. In some embodiments, the width of an artificial lash extension is much wider than a single cluster that is typically 1-2 mm wide.

Artificial lash extension 700 of FIG. 7 further illustrates adjacent artificial hairs (or adjacent clusters 704) that are coupled or secured to one another at connecting portions 710A-710H (collectively referred to as "connecting portions 710" herein) of the crisscrossing artificial hairs 702. For example, at least one hair of a particular cluster can be secured (e.g., directly or indirectly) to one or more hairs of an adjacent cluster at a connecting portion. In some embodiments, connecting portions 710 can connect artificial hairs (e.g., clusters) of an artificial lash extension together at areas between the two ends of the artificial hairs such that the artificial hairs of the artificial lash extension are connected directly or indirectly to one another to form an artificial lash extension and both ends of the artificial hairs not connected together (e.g., open ended).

In some embodiments, the connecting portions 710 (also referred to "base 710" herein) can be considered a base, as described herein. In some embodiments, the connecting portions 710 can be formed by an attachment operation, as described herein. In some embodiments, the connecting portions 710 can be formed by an attachment operation that includes an application of heat in a similar manner as described herein. In some embodiments, the connecting portions 710 can be formed by an attachment operation that includes an application of pressure in a similar manner as described herein. In some embodiments, the connecting portions 710 can be formed using one or more of an application of heat, an application of adhesive, an application of pressure, or a chemical process as described herein. For example, the crisscrossing artificial hairs 702 are connected or secured together approximately 1 mm to approximately 5 mm (+/−0.5 mm) above the ends 706 of the artificial hairs 702 (e.g., the ends 706 that are opposite the ends 708) using an attachment operation.

In some embodiments, the clusters can be secured to one another above ends 706 using an attachment operation that includes an artificial material to form connecting portions 710. In some embodiments, additional artificial material such as one or more artificial hairs or other material(s) can be placed or connected horizontally with respect to the lengthwise direction of the artificial hairs (e.g., across the area designated by the connecting portions 710). The artificial hairs or clusters of artificial hairs can be connected to the additional artificial material using an attachment operation that includes one or more of an application of heat, an application of adhesive, an application of pressure, a chemical process, or a thread as described herein. In some embodiments, the application of the additional artificial material that is used to connect the artificial hairs of artificial lash extension 700 can be similar to the application of additional artificial material used to form a base as described herein.

In some embodiments, the base (similar to base 606 of artificial lash extension 600) can be formed and subsequently removed after the formation of the connecting portions 710, such that the artificial lash extension 700 does not include the base similar to base 606. In some embodiments, the secured connecting portions 710 can hold artificial hairs 702 of the artificial lash extension 700 together in the absence of a base similar to base 606. In some embodiments, the connecting portions 710 of the crisscrossing artificial hairs 702 can be formed without forming a base that similar to base 606 of artificial lash extension 600.

It should be appreciated that artificial lash extension 600 and 700 are provided for purposes of illustration, rather than limitation.

In some embodiments, each artificial lash extension in a set of lash extensions can include multiple clusters of artificial hairs and a base (e.g., such as base 606 or a base including connecting portions 710). In some embodiments, at least the base of the artificial lash extension can include a surface that is textured, such as texture 610 of base 606 or texture 712A through 712H (generally referred to as "texture 712" herein) of connecting portions 710 (also referred to as a base). In some embodiments, the texture, such a texture 610 or texture 712 of a base can promote adhesion to a surface, such as an underside of natural eyelashes, using an adhesive.

In other embodiments, different parts of the artificial lash extension can be textured (including or not including the textured base) to help promote adhesion to a surface using an adhesive.

In some embodiments, the texture can have a pattern. A patterned texture can have at least some repeating features and/or a repeating arrangement of features. In some embodiments, the pattern texture is symmetrical. In some embodiments, the texture can be unpatterned. A patterned texture can also result from, for example, pressing, molding, or stamping the artificial lash extension such that the pressing, molding, or stamping results in a roughened or indented surface on the artificial lash extension. An unpatterned texture can have non-repeating features and/or a non-repeating arrangement of features. Patterned textures and unpatterned textures are further described at least with respect to FIG. 5.

In some embodiments, the surface of the top side of the base is textured, and the surface of the bottom side of the base (opposite the top side of the base) is untextured (e.g., substantially smooth, or at least not intentionally textured). In some embodiments, the surface of the top side of the base is textured, and the surface of the bottom side of the base is different from the textured surface of the top side of the base.

In some embodiments, the base of an artificial lash extension can be a single unit (e.g., monolithic) formed of a first material, such as PBT or polyester. In some embodiments, the texture, such as texture 610 and 712, and can be formed in the first material and be part of the single unit. Artificial lash extension 600 and artificial lash extension 700 illustrate example artificial lash extensions having a base and a texture thereon formed as a single unit. In some embodiments, the texture of the base is intentionally or deliberately formed to promote adhesion to a surface, such as the underside of natural eyelashes. In some embodiments, the texture of the base is intentionally or deliberately formed using a texturing operation.

FIG. 8 is a block diagram of an example conversion system architecture 800 for providing conversion of 2D image data corresponding to a 2D image to a corresponding 3D model (e.g., of a human face of a subject), in accordance with aspects of the disclosure. In some embodiments, conversion system 820 can include one or more of preprocessing engine 806, conversion engine 808, and/or postprocessing engine 810. In some embodiments, conversion system 820 can use the 2D image data 803 corresponding to image 802 to generate the 3D model data 816 of a 3D model 814.

In some embodiments, image 802 is a 2D image that is represented by 2D image data 803. As described above, in some embodiments, image 802 can include an image of a subject's face or a part of the subject's face (e.g., an image of a subject's eye area).

Image 802 may depict one or more facial features, such as facial features 804A-N of the subject's face. As described above, a facial feature can refer to a physical characteristic or element that is part of a human face. Examples of facial features that may be depicted in image 802 include eyebrow features (e.g., inner eyebrow, eyebrow apex, center eyebrow, outer eyebrow) represented by facial feature 804A, eye features (e.g., pupil, inner eye, outer eye, upper lid, tightline) represented by facial feature 804B, nose features (e.g., bridge, nostrils) represented by facial feature 804C, lip features (e.g., upper lip, lower lip) represented by facial feature 804N, mouth features (e.g., corner of the mouth), and so forth.

In some embodiments and as noted above, conversion system 820 can use the 2D image data 803 corresponding to the image 802 as input to the conversion system 820.

In some embodiments and as noted above, conversion system 820 can use the 2D image data 803 of image 802 to generate information corresponding to 3D model 814 (e.g., 3D model data 816). As described above, 3D model 814 can refer to a three-dimensional digital representation of a scene or object. The 3D model can be represented by 3D model data 816. As described above, in some embodiments, one or more of vertices, edges and faces can define the geometry of a 3D model 814.

As described above, in some embodiments, 3D model data 816 of the 3D model 814 includes material information that can influence the appearance of the 3D model 814 at rendering (e.g., how light reflects from the material).

In some embodiments, the 3D model data 816 of the 3D model 814 can include landmark data, such as 3D landmark data 812. In some embodiments, one or more landmarks can be represented by 3D landmark data 812. In some embodiments, a landmark can be represented by the grouping of points of the 3D model 814 that represent the right eye, the inner corner of the eyes, the bridge of the nose, a centerline of a face, or some other facial feature.

In some embodiments, 3D landmark data 812 can include information identifying one or more points of the 3D model 814 (e.g., specific grouping of points and/or 3D coordinate data of the points) that correspond to a feature, such as a facial feature. In some embodiments, 3D landmark data 812 can include information identifying the relationship between one or more points of a landmark. To identify the relationship between the one or more points of a landmark, the 3D landmark data 812 can include information identifying one or more of edges, faces, geometric data, such as length, height, and depth, and/or ratios of geometric data. To identify the relationship between the one or more points of a landmark, the 3D landmark data 812 can include one or more of absolute or relative values (e.g., deviations from average or template values). As described above, in some embodiments, 3D landmark data 812 can include information identifying relationships between multiple landmarks.

In some embodiments, preprocessing engine 806 of conversion system 820 can perform one or more preprocessing operations on 2D image data 803. In some embodiments, preprocessing engine can clean, transform, and/or organize the 2D image data 803 of image 802 in a manner suitable to be received by conversion engine 808 (also referred to as "preprocessed 2D image data" herein). For example, preprocessing engine 806 may scale or crop the image 802 and generate corresponding 2D image data (e.g., preprocessed image data, such as 2D image data 803). In some embodiments, preprocessing engine 806 can convert image 802 from an RGB color space to a grayscale color space, or vice versa. In some embodiments, preprocessing engine 806 can convert image 802 to a common or preferred format (e.g., JPEG).

In some embodiments, preprocessing engine 806 may perform preprocessing with one or more machine learning (ML) models. For example, a machine learning (ML) model may be implemented to identify one or more facial features, such as facial features 804A-N (which may be added to 2D image data 803 (e.g., metadata) of image 802). In another example, an ML model can be used to enhance contrast or resolution of image 802. In some embodiments, an ML model can be used to remove objects or a background element from image 802. For instance, an ML model can be used to remove glasses from a subject's face and fill the area where the glasses were removed with color and/or texture that is similar or that appears seamless with the surrounding area.

In an embodiment where conversion engine 808 includes an ML model as described below, preprocessing engine 806 may select or exclude various input images (e.g., image 802) as part of a training procedure to achieve a desired effect in training the ML model of conversion engine 808. In an embodiment, preprocessing engine 806 may not be implemented, and 2D image data 803 (e.g., raw 2D image data) of image 802 may be provided as input to conversion engine 808.

In some embodiments, conversion engine 808 uses the 2D image data 803 (e.g., raw, or preprocessed) to generate a 3D model 814 (e.g., 3D model data 816 of 3D model 814). In some embodiments, conversion engine 808 can generate the 3D model 814 with or without postprocessing engine 810.

In some embodiments, conversion engine 808 can implement one or more techniques to convert the 2D image data 803 to a 3D model 814. In some embodiments, conversion engine 808 may include an ML technique (e.g., statistical learning, deep learning, reinforcement learning, etc.) to convert the 2D image data 803 into a 3D model 814. For example, conversion engine 808 may include a neural radiance field (NeRF) ML model. In another example, conversion engine 808 may include an ML model based on differential rendering or inverse rendering techniques. ML models of conversion engine 808 may operate in a training mode or an inference mode. In a training mode, 2D and/or 3D training data may be provided as input and/or output of the ML model for supervised or unsupervised training. In an inference mode, 2D image data 803 may be provided as input to the ML model for generation of 3D model data 816 of 3D model 814 in accordance with previous training.

In some embodiments, conversion engine 808 may include a principal component analysis (PCA) model (further described below with reference to FIGS. 11-12) to convert the 2D image data 803 to a 3D model 814.

In some embodiments, conversion engine 808 may include a non-machine learning technique for converting the 2D image data 803 into 3D model 814. For example, conversion engine 808 may include parametric techniques based on various mathematical or physical principals, heuristics, or similar. In some embodiments, conversion engine 808 may include an ML module and/or a non-machine learning module for converting the 2D image data 803 into 3D model data 816 of 3D model 814.

In some embodiments, postprocessing engine 810 of conversion system 820 can perform one or more postprocessing operations on 3D model data 816 (e.g., also referred to as "postprocessed 3D model data" herein). In some embodiments, postprocessing engine 810 can perform further analysis, refinement, transformations and/or other modifications of 3D model data 816 received from conversion engine 808. For example, postprocessing engine 810 may generate a set of 3D landmark data of one or more landmarks corresponding to facial features by grouping particular vertices of the 3D model 814 that represent respective landmarks. In another example, postprocessing engine 810 can remove or modify the 3D model data 816. In some embodiments, postprocessing engine can emphasize particular landmarks (e.g., weighting or PCA techniques) and/or define particular landmarks and/or remove particular landmarks and/or de-emphasize particular landmarks. In some embodiments, postprocessing engine 810 is not implemented, and thus 3D landmark data 812 can be generated by conversion engine 808.

Figure 9:
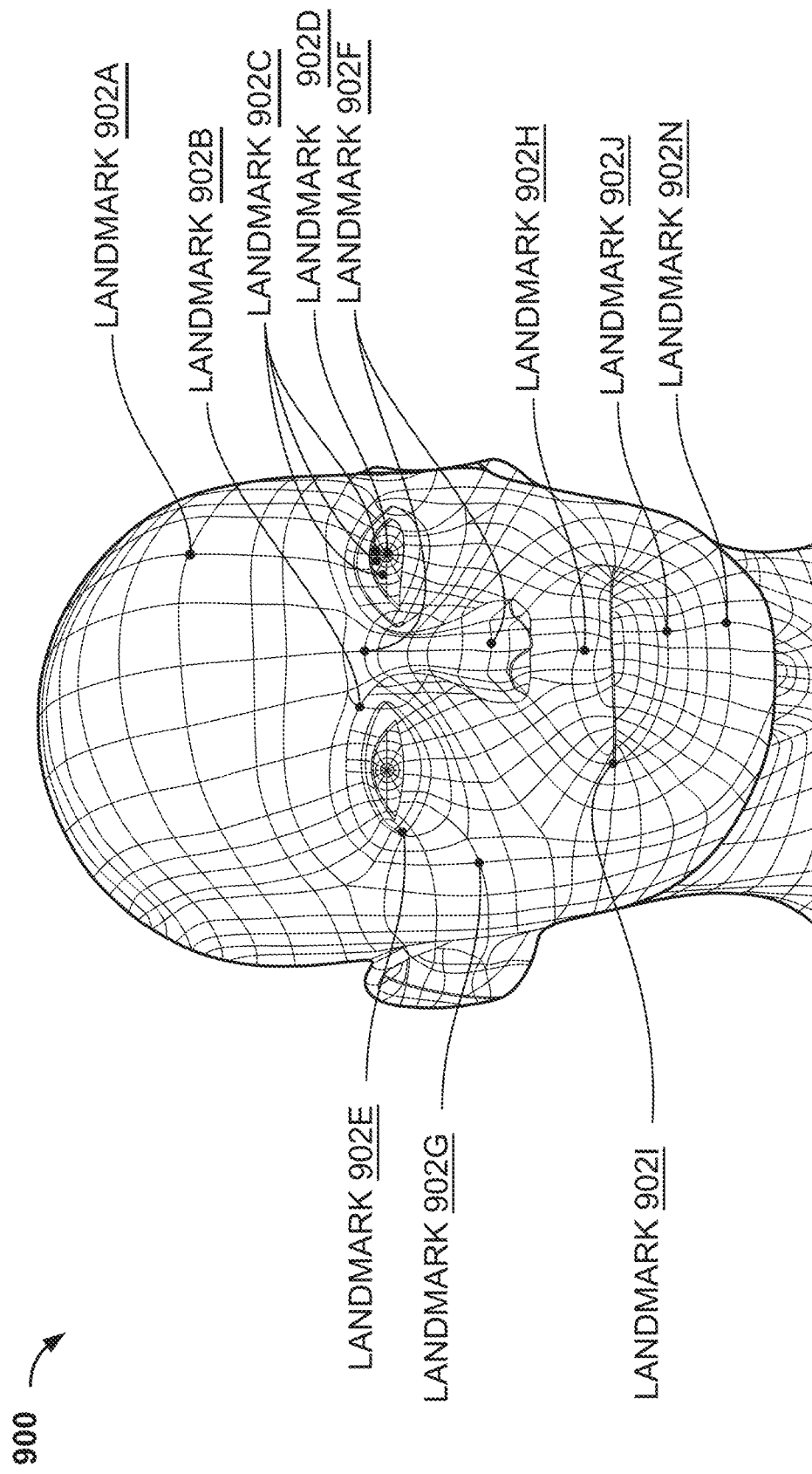
FIG. 9 depicts an example of a 3D model of a face of a subject, in accordance with aspects of the disclosure.

FIG. 9 depicts an example of a 3D model 900 of a face of a subject, in accordance with aspects of the disclosure. In some embodiments, 3D model 900 (e.g., rendered 3D model) may, for the sake of illustration and not limitation, correspond to image 802 of FIG. 8. 3D model data 816 may be used to generate, render, or modify the 3D model 900 to represent the subject's face. Landmarks 902A-N of 3D model 900 may correspond to and be represented by 3D landmark data 812 of FIG. 8. As noted herein, landmarks can correspond to features such as facial features. For example, landmark 902F can correspond to the bridge of the nose. Landmark 902C can correspond to the lash line of the left eye. Landmark 902D can correspond to the center point of the pupil of the left eye, and so forth.

In some embodiments, 3D model 900 may correspond to various types of 3D modeling techniques. For example, in an embodiment, 3D model 900 may be a mathematical model. In some embodiments, a mathematical model can include a parametric model where landmarks 902A-N and other 3D features may be represented by mathematical functions such as one or more of points, lines, arcs, Bezier curves, functional manifolds, and so on. In another embodiment, 3D model 900 may be a mesh model, a point cloud model, or similar model comprising multiple objects such as vertices, lines, and faces to represent the subject's face. Landmarks 902A-N may correspond to one or more vertices, one or more lines, one or more faces, or sets thereof. In some embodiments, landmarks 902A-N may share or overlap geometry. For example, two overlapping landmarks may share vertices, lines, etc. In another embodiment, 3D model 900 may be an ML model, such as a neural radiance field model trained to produce 2D views of the subject's face from multiple positions in 3D space. Landmarks 902A-N may correspond to weights, convolutional filters, or other aspects of the ML model (which can be captured in corresponding 3D model data). In another embodiment, 3D model 900 may comprise multiple model representations, such as a parametric representation combined with a mesh representation or similar.

In an embodiment, 3D model 900 may be a morphological model. A morphological model can represent the shape and structure of objects (e.g., human faces) using morphological data. In some embodiments, morphological data can describe the form and structural relationships between geometry (e.g., vertices, lines, planes and/or landmarks) of the model and enables manipulation of the geometry based on those relationships. In some embodiments, a morphological model may include a template model (e.g., 3D template model) of a human face. The template model may be initialized with template 3D model values (e.g., template landmark data) reflecting average values (e.g., average positions, sizes, colors, etc.) for an object, such as a human face. The template 3D model values may be derived from a representative collection of objects, such as human faces or features thereof. In some embodiments, the template model can be used as a reference model that can be compared to values representing a subject's unique face. In some embodiments, the comparison can generate difference information (e.g., metric) reflecting differences (e.g., deltas or deviations) between the template 3D model values, and in particular the template landmark data, and values representing corresponding points and/or facial features of the subject's face. The difference information can be stored as part of 3D landmark data 812. To generate the 3D model of the subject's face, conversion system 820 may adjust the template model based on the difference information corresponding to a particular subject, which can contribute to computational efficiency in generating a 3D model. In some embodiments, a morphological model can be used with a PCA model to generate a 3D model, as described further below.

Figure 10A:
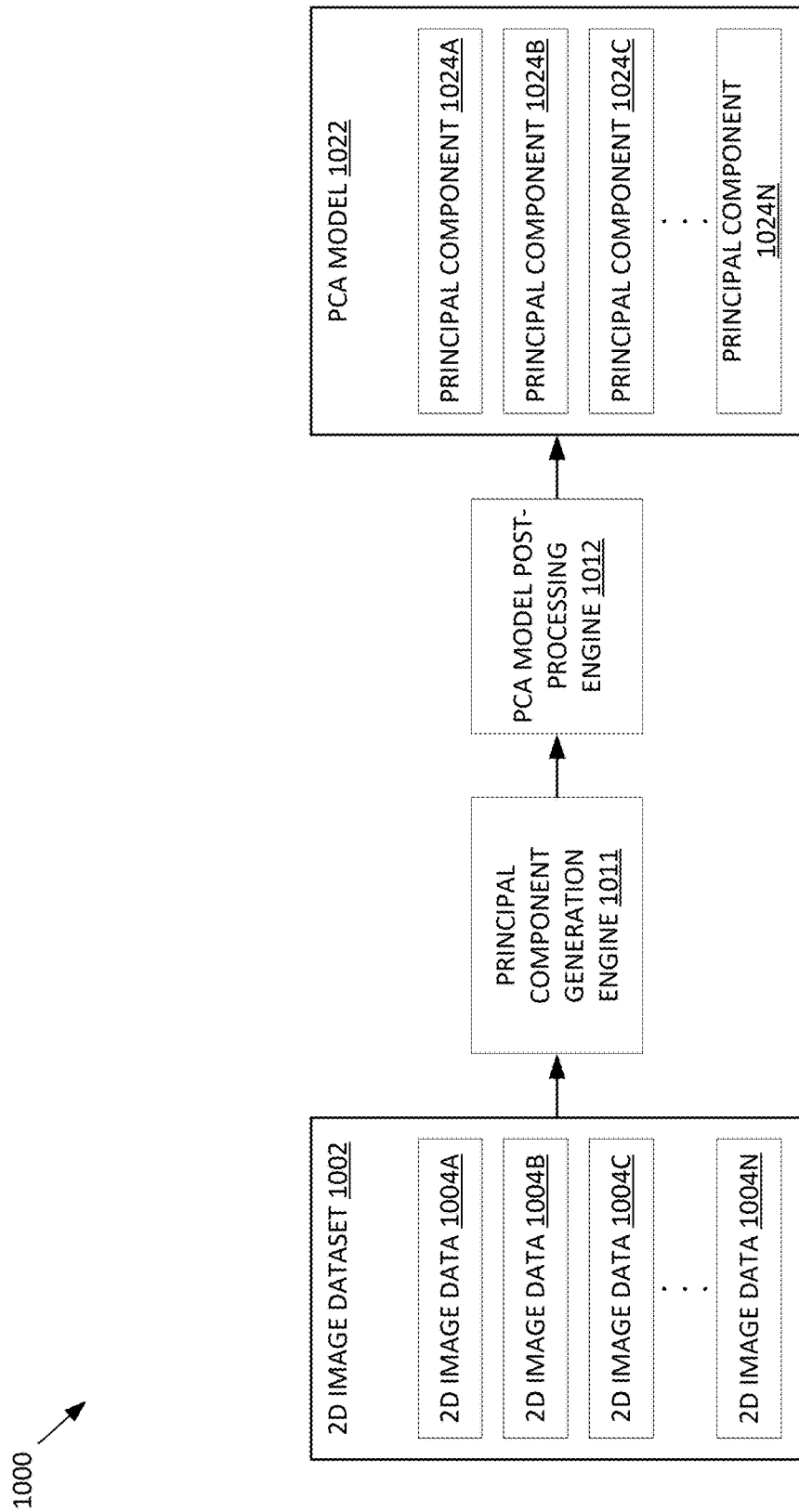
FIG. 10A is an example pipeline block diagram of an architecture for a principal component analysis (PCA) model generation architecture to train a PCA model of principal components, in accordance with some embodiments.
Figure 10B:
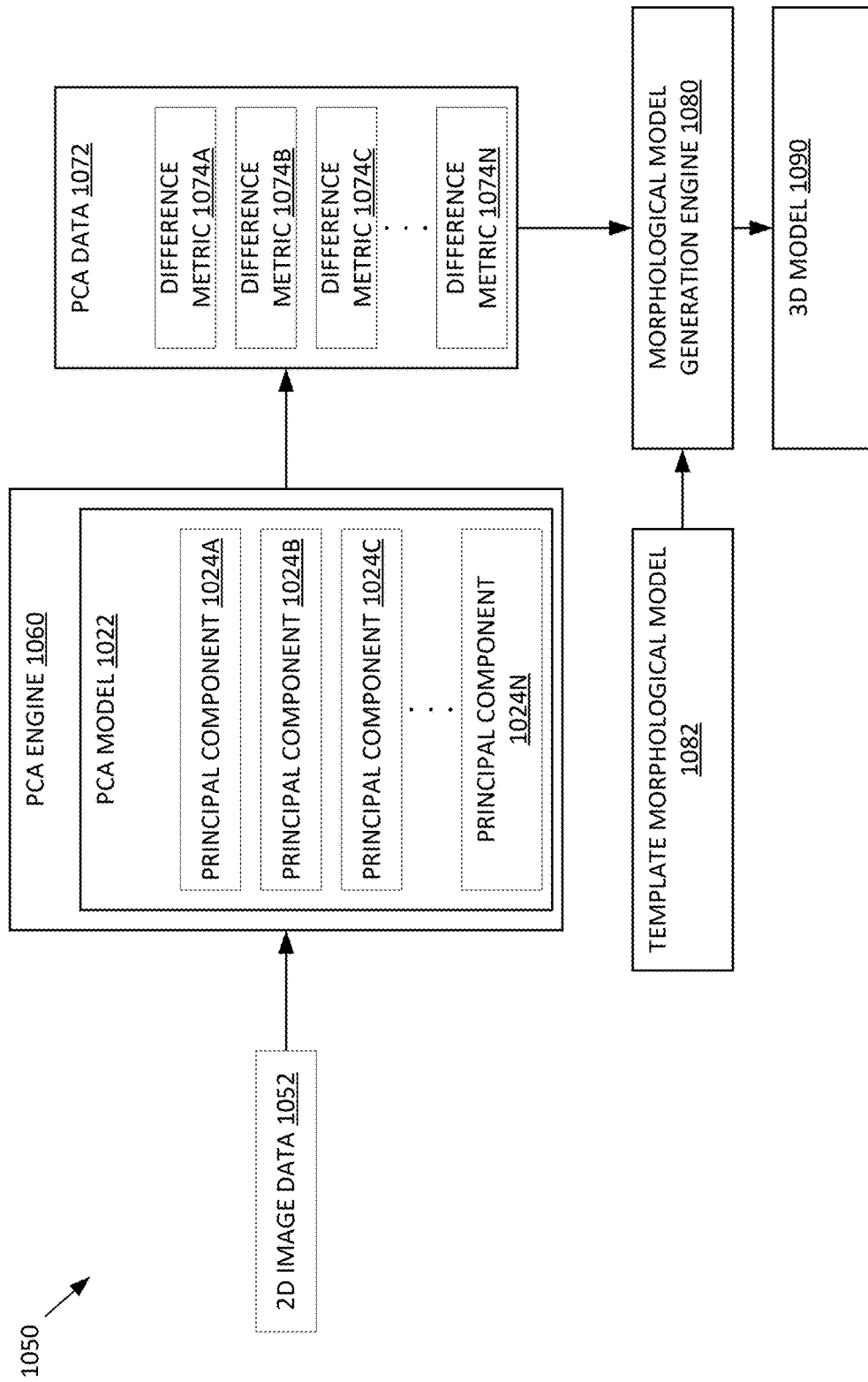
FIG. 10B is an example pipeline block diagram of a 3D model generation architecture 1050 for generating a 3D model from 2D image data using a trained PCA model and a morphological model.

FIG. 10A is an example pipeline block diagram of an architecture 1000 for a principal component analysis (PCA) model generation architecture to train a PCA model of principal components, in accordance with some embodiments. FIG. 10B is an example pipeline block diagram of a 3D model generation architecture 1050 for generating a 3D model from 2D image data using a trained PCA model and a morphological model.

In some embodiments, PCA can refer to a technique that can be used to transform a dataset into a new set of dimensions (principal components). The principal components may include linear combinations of original data features in the dataset. The combinations can be derived to capture variance (e.g., maximum variance) in the dataset. The principal components may be orthogonal (e.g., uncorrelated) and ranked according to the variance. In some embodiments, the resulting principal components can form, at least in part, a trained PCA model based on the dataset (the training data). The trained PCA model can be used to characterize or transform other data into respective principal components by projecting the other data onto the principal components of the trained PCA model. In some embodiments, PCA techniques can be used to transform features (e.g., facial features) of the original data, such as 2D image data, into a new set of principal components, which may be used to generate the 3D models and perform other analyses on the 2D image data.

Referring to FIG. 10A, architecture 1000 includes 2D image dataset 1002, principal component generation engine 1011, PCA model postprocessing engine 1012, and PCA model 1022. In some embodiments, 2D image dataset 1002 includes one or more 2D image data 1004A-N each corresponding to a respective 2D image. In some embodiments, each of 2D image data 1004A-N may correspond to a 2D image of a human face, such as image 802 of FIG. 8. In some embodiments, 2D image dataset 1002 may be derived from a training set of 2D images of human faces, which may be manually or automatically curated. In some embodiments, and as described with reference to FIG. 5, the data of 2D image dataset 1002 may be preprocessed with various techniques to change resolutions, adjust color depths, prune undesirable image data, or similar.

In some embodiments, PCA model 1022 includes one or more principal components 1024A-N each associated with a feature, such as 2D facial feature. In some embodiments, a principal component of principal components 1024A-N may correspond to a human-derived facial feature, such as eye color, inner eye distance, eye angle, jaw shape, or similar. As described above, a human-derived facial feature can refer to a physical characteristic or element that is part of a human face and that naturally occurs on an individual's face and can be assessed or recognized by a human eye (e.g., human perception). In some embodiments, a principal component of principal components 1024A-N may correspond to a computer-derived facial feature, such as a correlation between multiple human-derived facial features (e.g., a correlation between inner eye distance and jaw shape), non-human derived facial features, or a combination thereof.

In some embodiments, a principal component of principal components 1024A-N may correspond to a computer-derived facial feature. A computer-derived facial feature can refer to attributes or information about an individual's face that is extracted, analyzed, or recognized by a computer (e.g., processing device implementing digital image processing). A computer-derived facial feature may not be assessed or recognized by a human eye. In some embodiments, the computer-derived facial feature is generated by an algorithm (e.g., PCA model, machine learning model, etc.). In some embodiments, the computer-derived facial feature is generated by an algorithm without human intervention. In some embodiments, the principal components of a trained PCA model 1022 (including principal components corresponding to human-derived and/or computer-derived features) may represent an average or template set of facial features based on the variance of facial features present in 2D image dataset 1002. A difference (e.g., difference metric) between an individual subject's facial feature and the principal component template can thus be expressed as a weight (e.g., a multiplier or a difference) of the corresponding principal component (e.g., the facial features is stronger/weaker than average as indicated by a larger/smaller weight or a positive/negative weight), as described below with reference to FIG. 10B.

In some embodiments, PCA model 1022 can be generated or trained by one or more of principal component generation engine 1011 or PCA model postprocessing engine 1012. In some embodiments, principal components 1024A-N may be derived from 2D image dataset 1002 using PCA training techniques. In some embodiments, 2D image dataset 1002 may be modified to elicit select principal components. In some embodiments, 2D image dataset 1002 may be modified to elicit principal components corresponding to human-derived facial features. For example, a dataset representing human faces may be manually or automatically chosen (e.g., by preprocessing engine 806) to encourage identification of specific human-derived facial features. A feedback loop may be used with multiple generation cycles in principal component generation engine 1011 to refine the dataset and/or resulting principal components. In some embodiments, the principal components may be selected, modified, pruned, or a combination thereof to retain principal components corresponding to one or criteria such as human-derived facial features. For example, principal components corresponding to computer-derived features may be manually or automatically removed (e.g., by PCA model postprocessing engine 1012 or postprocessing engine 810) to obtain PCA model 1022. In another example, principal components associated with different 2D image datasets (e.g., 2D image dataset 1002) may be combined to form a composite PCA model (e.g., a PCA model 1022) corresponding to human-derived facial features, where principal components 1024A-N of the composite model may not necessarily be orthogonal (e.g., uncorrelated) to each other as would be expected in a set of principal components derived from a single dataset.

Referring to FIG. 10B, 3D model generation architecture 1050 includes 2D image data 1052, PCA engine 1060, PCA data 1072, morphological model generation engine 1080, template morphological model 1082, and 3D model 1090. In some embodiments, 2D image data 1052 may correspond to an image of a scene or object, such as a subject's face (e.g., image 802 of FIG. 8). In some embodiments, PCA engine 1060 includes PCA model 1022 of FIG. 10A, with each principal component 1024A-N corresponding to a facial feature as previously described. In some embodiments, PCA engine 1060 can be used to transform or project the 2D image data 1052 into the facial feature eigenspace of PCA model 1022 (or non-eigenspace for a composite PCA model, such as a PCA model 1022 as previously described) to generate PCA data 1072. PCA engine 1060 may perform a set of operations (e.g., a set of dot product operations) to perform the projection. In some embodiments, PCA engine 1060 may correspond to conversion system 820 of FIG. 8.

In some embodiments, PCA data 1072 may include difference metrics 1074A-N (also referred to as "difference information" herein) representing the projection of 2D image data 1052 over each of principal components 1024A-N. A difference metric of difference metrics 1074A-N may correspond to a deviation (or delta, weight, strength, prominence, or other metric) of a facial feature of 2D image data 1052 from an average or template value represented by the corresponding principal component of principal components 1024A-N. For example, difference metric 1074A may represent a deviation of the subject's inner eye distance from the average distance within the images associated with 2D image dataset 1002. As previously described, difference metrics 1074A-N may correspond to a multiplier, difference, or other operation with respect to the template facial features represented by principal components 1024A-N.

In some embodiments, template morphological model 1082 may correspond to a generic 3D model of an object, such as a human face (e.g., 3D model 814 of FIG. 8). The 3D landmark data of the generic 3D model can each correspond to a principal component of principal components 1024A-N and an average or template value associated with the corresponding principal component. In some embodiments, template morphological model 1082 may be generated or configured (e.g., manually, or automatically) based on principal components 1024A-N such that each landmark represents the average facial feature of the corresponding principal component. In some embodiments, each landmark may correspond to one or more vertices, lines, faces, or other geometry of the model associated with the landmark's facial feature, and landmarks may share geometry. Template morphological model 1082 may further be configured such that a landmark may be modified (e.g., morphed) based on a difference metric of PCA data 1072. For example, a landmark may be associated with a control variable that modifies the landmark to increase or decrease the prominence (or other metric) of the corresponding facial feature. The geometry associated with the landmark will be modified as a result. In an example, a vertex of template morphological model 1082 located at the inner corner of the eye may be associated with both an inner eye distance landmark (corresponding to an inner eye distance facial feature) and an eye angle landmark (corresponding to an eye angle facial feature). Morphing the control variables of either landmark may change the coordinates of the vertex.

In some embodiments, PCA data 1072 and template morphological model 1082 may be provided as input to morphological model generation engine 1080 for generation of 3D model 1090. 3D model 1090 can be similar to 3D model 514 of FIG. 5, unless otherwise described. Morphological model generation engine 1080 may use difference metrics 1074A-N of PCA data 1072 to modify the corresponding landmarks of template morphological model 1082 to generate in 3D model 1090 that is representative of the subject's face. For example, a control variables of template morphological model 1082 may be multiplied by or added to respective ones of difference metrics 1074A-N to accurately represent the subject's unique facial features in 3D model 1090.

Figures 11A, 11B:
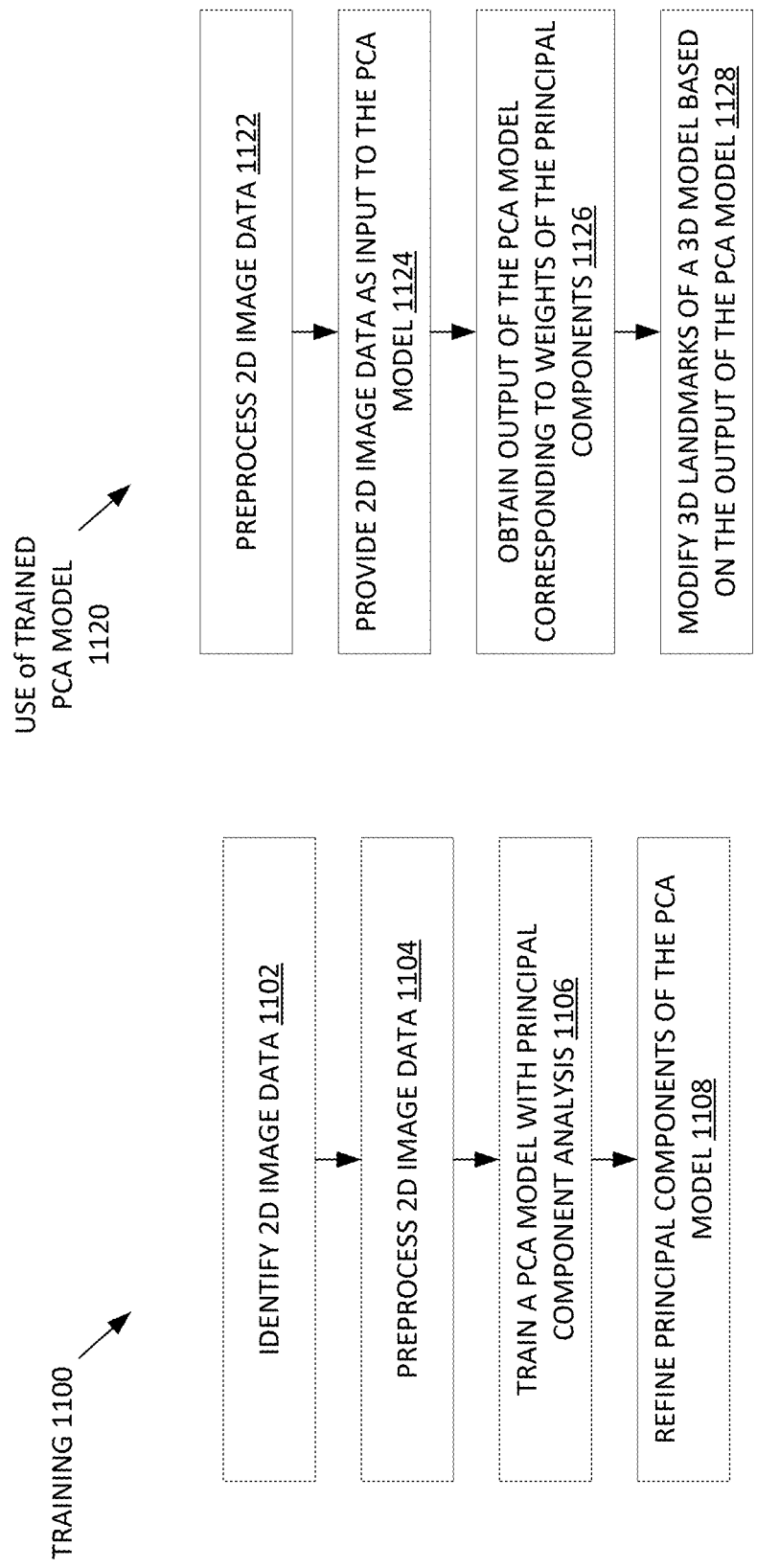
FIG. 11A illustrates a flow diagram of an example of a method for training a PCA model, in accordance with aspects of the disclosure.
FIG. 11B illustrates a flow diagram of an example of a method for using a trained PCA model, in accordance with aspects of the disclosure.

FIG. 11A illustrates a flow diagram of an example of a method 1100 for training a PCA model, in accordance with aspects of the disclosure. FIG. 11B illustrates a flow diagram of an example of a method 1120 for using a trained PCA model, in accordance with aspects of the disclosure. Methods 1100 and 1120 may be performed by processing logic that may comprise hardware (e.g., circuitry, dedicated logic, etc.), computer-readable instructions such as software or firmware (e.g., run on a general-purpose computing system or a dedicated machine), or a combination thereof. Methods 1100 and 1120 may also be associated with sets of instructions stored on a non-transitory computer-readable medium (e.g., magnetic, or optical disk, etc.). The instructions, when executed by a processing device, may cause the processing device to perform operations comprising the blocks of methods 1100 and 1120. In an embodiment, methods 1100 and 1120 are performed by system 100A or system 100B of FIGS. 1A-B. In an embodiment, blocks of a particular method depicted in FIGS. 10A-B can be performed simultaneously or in different orders than depicted. Various embodiments may include additional blocks not depicted in FIGS. 10A-B or a subset of blocks depicted in FIGS. 10A-B.

Referring to FIG. 11A, at block 1102, processing logic identifies 2D image data, which may correspond to images of human faces. For example, processing logic may identify the 2D image data (e.g., 2D image data 803 of FIG. 8) corresponding to one or more images (e.g. images 802 of FIG. 8). The 2D images of human faces may be images of a training set, which may be manually or automatically curated.

At block 1104, the processing logic preprocesses the 2D image data. For example, preprocessing engine 806 may select 2D image data to elicit human-derived principal components corresponding to human-derived facial features as described above with reference to FIG. 10. Other preprocessing may occur at block 1104, such as normalizing the 2D image data, cropping the 2D image data to consistent dimensions, augmenting the 2D image data to generate additional training data, etc.

At block 1106, the processing logic trains a PCA model with principal component analysis techniques using the 2D image data from the previous blocks. In some embodiments, the resulting principal components of the trained PCA model may correspond to human-derived facial features or computer-derived facial features or a combination thereof. In an embodiment, blocks 1104-1106 may be repeated in a loop to achieve desired principal components (e.g., corresponding to human-derived facial features) as described above with reference to FIGS. 10A-B.

At block 1108, processing logic refines the principal components of the PCA model. For example, postprocessing engine 810 may prune or modify non-human-derived principal components or may combine human-derived components from different training blocks (e.g., each block 1106 associated with a different training set of 2D image data).

Referring to FIG. 11B, at block 1122, processing logic preprocesses input 2D image data (e.g., corresponding to an image of a subject's face). For example, preprocessing engine 806 may normalize the input 2D image data, flatten it to a vector, or perform other preprocessing operations.

At block 1124, processing logic provides the preprocessed 2D image data as input to the trained PCA model.

At block 1126, processing logic obtains an output of the PCA model corresponding to weights of the principal components. For example, in blocks 1124 and 1126, the preprocessed input 2D image data may be projected onto the eigenspace defined by the principal components, and the weights indicating the deviation of the input 2D image data from the training set (e.g., difference metrics) may be obtained from the projection.

At block 1128, the processing logic modifies landmarks of a 3D model (e.g., a morphological model of a template face) based on the output of the PCA model. For example, landmarks 1002A-N of 3D architecture 1000 may be modified based on a deviation (e.g., difference metrics) from the template model indicated by the weights obtained at block 1126.

Figure 12:
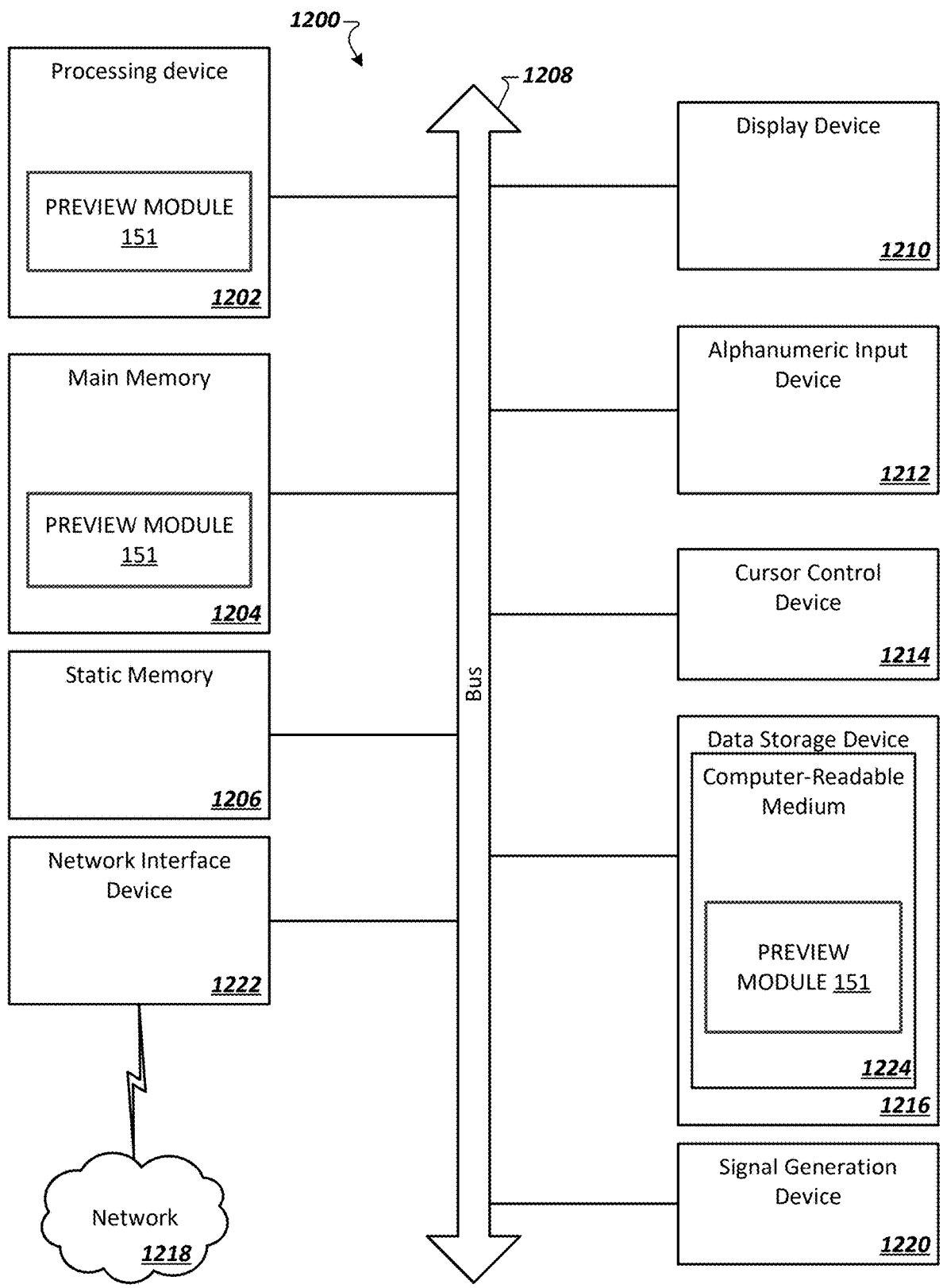
FIG. 12 is a block diagram illustrating an exemplary computer system 1200, in accordance with an embodiment of the disclosure.

FIG. 12 is a block diagram illustrating an exemplary computer system 1200, in accordance with an embodiment of the disclosure. The computer system 1200 executes one or more sets of instructions that cause the machine to perform any one or more of the methodologies discussed herein. Set of instructions, instructions, and the like may refer to instructions that, when executed by computer system 1200, cause computer system 1200 to perform one or more operations of preview module 151. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 1200 includes a processing device 1202, a main memory 1204 (e.g., read-only memory (ROM), flash memory, dynamic random access memory (DRAM) such as synchronous DRAM (SDRAM) or Rambus DRAM (RDRAM), etc.), a static memory 1206 (e.g., flash memory, static random access memory (SRAM), etc.), and a data storage device 1216, which communicate with each other via a bus 1208.

The processing device 1202 represents one or more general-purpose processing devices such as a microprocessor, central processing unit, or the like. More particularly, the processing device 1202 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 1202 may also be one or more special-purpose processing devices such as an application specific integrated circuit (ASIC), a field programmable gate array (FPGA), a digital signal processor (DSP), network processor, or the like. The processing device 1202 is configured to execute instructions of the system architecture 100B and preview module 151 for performing the operations discussed herein.

The computer system 1200 may further include a network interface device 1222 that provides communication with other machines over a network 1218, such as a local area network (LAN), an intranet, an extranet, or the Internet. The computer system 1200 also may include a display device 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1220 (e.g., a speaker).

The data storage device 1216 may include a non-transitory computer-readable storage medium 1224 on which is stored the sets of instructions of the system architecture 100B of preview module 151 embodying any one or more of the methodologies or functions described herein. The sets of instructions of the system architecture 100B and of preview module 151 may also reside, completely or at least partially, within the main memory 1204 and/or within the processing device 1202 during execution thereof by the computer system 1200, the main memory 1204 and the processing device 1202 also constituting computer-readable storage media. The sets of instructions may further be transmitted or received over the network 1218 via the network interface device 1222.

While the example of the computer-readable storage medium 1224 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that causes the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "generating," "providing," "receiving," "modifying," "identifying," "determining," or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

Reference to "one embodiment" or "an embodiment" means that a particular feature, structure, or characteristic described in connection with the embodiment is included in at least one embodiment of the disclosure. The appearances of the phrase "in some embodiments" are not necessarily referring to the same embodiment, nor are they necessarily referring to separate or alternative embodiments that are mutually exclusive of one another.

The terms "connected," "coupled," or any variant thereof includes any connection or coupling between two or more elements, either direct or indirect. The coupling or connection between the elements can be physical, logical, or a combination thereof. For example, two components may be coupled directly to one another or via one or more intermediary channels/components. The words "associate with," meanwhile, mean connecting or relating objects, items, etc.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

What is claimed is:

1. A method comprising:
    performing, by a processing device, a first computer vision operation on a first video segment of a video stream to track a plurality of points each corresponding to a respective location at an underside of natural eyelashes of an eye area of a subject;
    modifying the first video segment to include a first overlay of a first model of a first artificial lash extension positioned at least at a first point of the plurality of points corresponding to a first location at the underside of the natural eyelashes; and
    providing the first modified video segment for presentation at a client device associated with the subject.

2. The method of claim 1, further comprising:
    receiving, from the client device, the first video segment of the video stream, the first video segment representing the eye area of the subject.

3. The method of claim 1, further comprising:
    modifying the first video segment to include a second overlay of a second model of a second artificial lash extension positioned at least at a second point of the plurality of points corresponding to a second location at the underside of the natural eyelashes.

4. The method of claim 1, wherein the first model of the first artificial lash extension comprises a three-dimensional (3D) model of the first artificial lash extension.

5. The method of claim 1, further comprising:
receiving, from the client device, an indication of a user selection of the first artificial lash extension among a plurality of artificial lash extensions, wherein modifying the first video segment to include the first overlay of the first model of the first artificial lash extension is responsive to receiving the indication of the user selection of the first artificial lash extension.

6. The method of claim 1, further comprising:
determining an orientation of the first model of the first artificial lash extension with respect to the underside of the natural eyelashes represented in the first video segment.

7. The method of claim 6, further comprising:
determining a position of the first model of the first artificial lash extension at the first location at the underside of the natural eyelashes represented in the first video segment.

8. The method of claim 7, further comprising:
scaling the first model of the first artificial lash extension to correspond with the position of the first model of the first artificial lash extension at the first location at the underside of the natural eyelashes represented in the first video segment.

9. The method of claim 8, further comprising:
generating, using the first video segment, a 3D model of the eye area of the subject.

10. The method of claim 9, wherein determining the orientation of the first model of the first artificial lash extension with respect to the underside of the natural eyelashes represented in the first video segment, comprises:
orientating the 3D model of the eye area in a coordinate system; and
orientating the first model of the first artificial lash extension in the coordinate system and with respect to the 3D model of the eye area.

11. The method of claim 10, wherein scaling the first model of the first artificial lash extension to correspond with the position of the first model of the first artificial lash extension at the first location at the underside of the natural eyelashes represented in the first video segment, comprises:
scaling dimensions of the first model of the first artificial lash extension to correspond to the position and the orientation within the coordinate system.

12. The method of claim 10, further comprising:
determining mapping data that maps the coordinate system of the first model of the first artificial lash extension and the 3D model of the eye area to the first video segment, wherein the first overlay is positioned in the first video segment based on the mapping data.

13. The method of claim 9, wherein determining the position of the first model of the first artificial lash extension at the first location at the underside of the natural eyelashes represented in the first video segment, comprises:
identifying a plurality of landmarks at the 3D model of the eye area of the subject, the plurality of landmarks corresponding to the plurality of points; and
positioning the first model of the first artificial lash extension with respect to the plurality of landmarks.

14. The method of claim 1, further comprising:
performing a second computer vision operation on a second video segment of the video stream to track one or more points corresponding to a user placement of the first model of the first artificial lash extension;
determining whether a position of the tracked one or more points corresponding to the user placement of the first model of the first artificial lash extension satisfies a condition indicative of a threshold proximity to one or more of the tracked plurality of points each corresponding to the respective location at the underside of the natural eyelashes; and
responsive to determining that the position of the tracked one or more points corresponding to the user placement of the first model of the first artificial lash extension satisfies the condition, modifying the second video segment to position the first overlay of the first model of the first artificial lash extension with respect to the one or more of the tracked plurality of points each corresponding to the respective location at the underside of the natural eyelashes.

15. A system, comprising:
a memory; and
a processing device, coupled to the memory, configured to perform operations comprising:
performing a first computer vision operation on a first video segment of a video stream to track a plurality of points each corresponding to a respective location at an underside of natural eyelashes of an eye area of a subject;
modifying the first video segment to include a first overlay of a first model of a first artificial lash extension positioned at least at a first point of the plurality of points corresponding to a first location at the underside of the natural eyelashes; and
providing the first modified video segment for presentation at a client device associated with the subject.

16. The system of claim 15, the operations further comprising:
modifying the first video segment to include a second overlay of a second model of a second artificial lash extension positioned at least at a second point of the plurality of points corresponding to a second location at the underside of the natural eyelashes.

17. The system of claim 15, wherein the first model of the first artificial lash extension comprises a three-dimensional (3D) model of the first artificial lash extension.

18. The system of claim 15, the operations further comprising:
receiving, from the client device, an indication of a user selection of the first artificial lash extension among a plurality of artificial lash extensions, wherein modifying the first video segment to include the first overlay of the first model of the first artificial lash extension is responsive to receiving the indication of the user selection of the first artificial lash extension.

19. A non-transitory computer-readable medium comprising instructions, that responsive to execution by a processing device, cause the processing device to perform operations comprising:
performing a first computer vision operation on a first video segment of a video stream to track a plurality of points each corresponding to a respective location at an underside of natural eyelashes of an eye area of a subject;
modifying the first video segment to include a first overlay of a first model of a first artificial lash extension positioned at least at a first point of the plurality of points corresponding to a first location at the underside of the natural eyelashes; and
providing the first modified video segment for presentation at a client device associated with the subject.

20. The non-transitory computer-readable medium of claim 19, the operations further comprising:

modifying the first video segment to include a second overlay of a second model of a second artificial lash extension positioned at least at a second point of the plurality of points corresponding to a second location at the underside of the natural eyelashes.

* * * * *